US012650968B2

(12) United States Patent
Wei et al.

(10) Patent No.: US 12,650,968 B2
(45) Date of Patent: Jun. 9, 2026

(54) MANAGING HIERARCHICAL DATA STRUCTURES FOR ENTITY MATCHING

(71) Applicant: U.S. Bancorp, National Association, Minneapolis, MN (US)

(72) Inventors: Xiaoqiao Wei, Woodbury, MN (US); Christopher Kallas, Grafton, WI (US); Wentao Lu, Minnetonka, MN (US); Carlos A. Garavito Garzon, Minneapolis, MN (US); Jon Doyle, Denver, CO (US); Ding Ma, Thousand Oaks, CA (US)

(73) Assignee: U.S. Bancorp, National Association, Minneapolis, MN (US)

( * ) Notice: Subject to any disclaimer, the term of this patent is extended or adjusted under 35 U.S.C. 154(b) by 0 days.

(21) Appl. No.: 19/286,118

(22) Filed: Jul. 30, 2025

(65) Prior Publication Data

US 2025/0355852 A1 Nov. 20, 2025

Related U.S. Application Data

(63) Continuation of application No. 18/824,702, filed on Sep. 4, 2024, now Pat. No. 12,399,881, which is a
(Continued)

(51) Int. Cl.
*G06F 16/22* (2019.01)
*G06F 16/28* (2019.01)

(52) U.S. Cl.
CPC ........ *G06F 16/2246* (2019.01); *G06F 16/288* (2019.01)

(58) Field of Classification Search
CPC ........................... G06F 16/2246; G06F 16/288
(Continued)

(56) References Cited

U.S. PATENT DOCUMENTS

| | | | | |
|---|---|---|---|---|
| 7,627,550 B1 * | 12/2009 | Adams | .............. | G06F 16/24556 |
| | | | | 707/999.005 |
| 8,037,075 B2 * | 10/2011 | Millett | ................... | G06F 16/31 |
| | | | | 707/822 |

(Continued)

FOREIGN PATENT DOCUMENTS

| | | | | |
|---|---|---|---|---|
| DE | 202017007212 U1 * | 2/2020 | ........... | G06F 16/278 |
| WO | WO-2016016734 A1 * | 2/2016 | .............. | H04M 3/42 |

(Continued)

OTHER PUBLICATIONS

"Subject Definitions" co-sponsored by US Bureau of Labor Statistics, census.gov/programs-surveys/cps/technical-documentation/subject-definitions.html#household, last revised Sep. 27, 2020, 23 pages.

(Continued)

*Primary Examiner* — Giovanna B Colan
(74) *Attorney, Agent, or Firm* — FOLEY & LARDNER

(57) ABSTRACT

A method comprises storing a plurality of accounts and generating a hierarchical data structure from the plurality of accounts by: identifying a first set of accounts and a second set of accounts responsive to the first set of accounts and the second set of accounts satisfying a first set of rules; linking the first set of accounts to a first entity profile and the second set of accounts to a second entity profile; and responsive to the first plurality of profile values and the second plurality of profile values of the second entity profile satisfying a second set of rules, linking the first entity profile and the second entity profile to a group entity profile.

20 Claims, 12 Drawing Sheets

Related U.S. Application Data continuation of application No. 17/696,641, filed on Mar. 16, 2022, now Pat. No. 12,105,689, which is a continuation-in-part of application No. 17/409,262, filed on Aug. 23, 2021, now Pat. No. 11,860,909.

(58) Field of Classification Search
USPC ......................................................... 707/741
See application file for complete search history.

(56) References Cited

U.S. PATENT DOCUMENTS

| | | | |
|---|---|---|---|
| 8,364,708 B1 | 1/2013 | Braytenbaum et al. | |
| 8,713,414 B2 | 4/2014 | Kamuf et al. | |
| 8,799,282 B2 | 8/2014 | Goldenberg et al. | |
| 9,286,332 B1 | 3/2016 | Roumeliotis et al. | |
| 9,600,563 B2 | 3/2017 | Ford et al. | |
| 10,489,462 B1 | 11/2019 | Rogynskyy et al. | |
| 10,983,983 B2 | 4/2021 | Kallas et al. | |
| 11,474,987 B1 | 10/2022 | Stein et al. | |
| 11,755,559 B1 * | 9/2023 | Tankersley | G06F 3/04847 707/694 |
| 2005/0021551 A1 | 1/2005 | Silva et al. | |
| 2007/0276858 A1 | 11/2007 | Cushman et al. | |
| 2008/0243885 A1 | 10/2008 | Harger et al. | |
| 2011/0093467 A1 * | 4/2011 | Sharp | G06F 16/2228 707/E17.069 |
| 2012/0330947 A1 * | 12/2012 | Huenemann | G06F 16/951 707/769 |
| 2014/0358932 A1 * | 12/2014 | Brown | G06F 16/24532 707/741 |

| | | | |
|---|---|---|---|
| 2016/0070790 A1 | 3/2016 | Bhat et al. | |
| 2017/0098245 A1 | 4/2017 | Palanciuc et al. | |
| 2017/0199872 A1 * | 7/2017 | Krasadakis | G06F 16/787 |
| 2017/0308557 A1 | 10/2017 | Cassidy et al. | |
| 2017/0374093 A1 * | 12/2017 | Dhar | G06Q 50/265 |
| 2019/0278855 A1 | 9/2019 | Kallas et al. | |
| 2019/0361845 A1 * | 11/2019 | Faith | G06F 16/164 |
| 2020/0320146 A1 | 10/2020 | Macadaan et al. | |
| 2021/0084097 A1 | 3/2021 | Whitcher et al. | |
| 2021/0117868 A1 * | 4/2021 | Sriharsha | G06N 20/20 |
| 2021/0357378 A1 | 11/2021 | Urdiales et al. | |
| 2023/0055163 A1 * | 2/2023 | McCreight | G06F 16/2474 |

FOREIGN PATENT DOCUMENTS

| | | | | |
|---|---|---|---|---|
| WO | WO-2016205286 A9 * | 12/2017 | | G06N 20/00 |
| WO | WO-2023276288 A1 * | 1/2023 | | G06F 21/62 |

OTHER PUBLICATIONS

Beaman et al., "Do Household Definitions Matter in Survey Design? Results from a Randomized Survey Experiment in Mali," (2011) pp. 1-34.

Glossary of Statistical Terms, stats.oecd.org/glossary/detail.asp?ID= 1255, last updated Jul. 29, 2002, 1 page.

HealthCare.gov; "How to Count Income and Household Members", healthcare.gov/income-and-household-information/household-size/; 5 pages.

Li et al., "Linking Temporal Records for Profiling Entities" (2015) Australia.

* cited by examiner

200

206

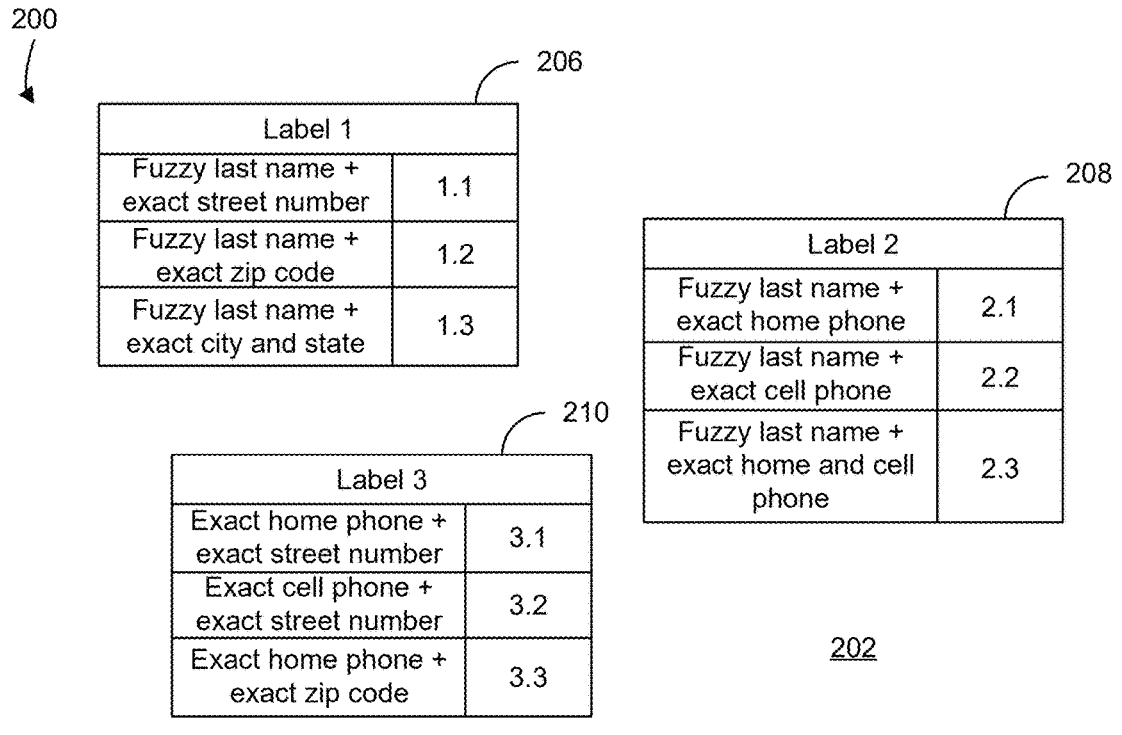

| Label 1 | |
|---|---|
| Fuzzy last name + exact street number | 1.1 |
| Fuzzy last name + exact zip code | 1.2 |
| Fuzzy last name + exact city and state | 1.3 |

208

| Label 2 | |
|---|---|
| Fuzzy last name + exact home phone | 2.1 |
| Fuzzy last name + exact cell phone | 2.2 |
| Fuzzy last name + exact home and cell phone | 2.3 |

210

| Label 3 | |
|---|---|
| Exact home phone + exact street number | 3.1 |
| Exact cell phone + exact street number | 3.2 |
| Exact home phone + exact zip code | 3.3 |

202

204

212

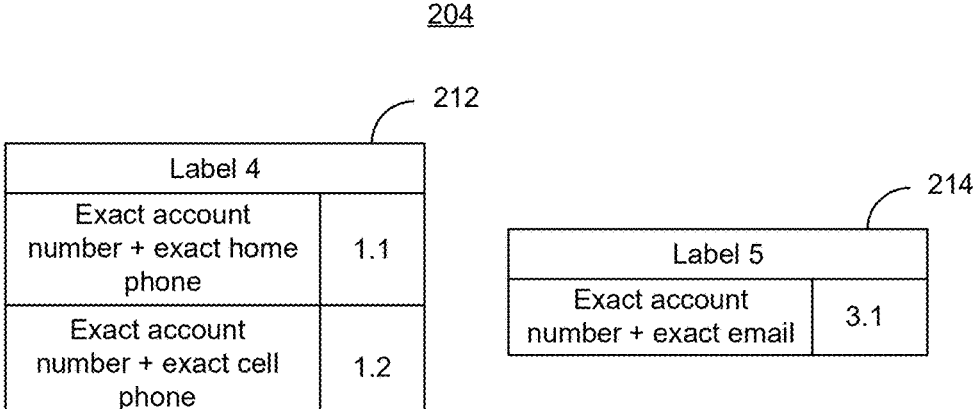

| Label 4 | |
|---|---|
| Exact account number + exact home phone | 1.1 |
| Exact account number + exact cell phone | 1.2 |

214

| Label 5 | |
|---|---|
| Exact account number + exact email | 3.1 |

| Name | Jane Doe | 302 |
| --- | --- | --- |
| Account Number | #089A5261 | 304 |
| Phone Number | (123)456-7890 | 306 |
| Email Address | Jane@acme.com | 308 |
| Address | 15 Elm Street, Los Angeles CA 90210 | 310 |
| Group Entity |  | 312 |

600

602

Client Device

604

Client Device

608

Network

610

Network Interface

606

Data Hierarchy Generator

612

Processor

614

Memory

616

Entity Profile Identifier

622

Profile Updater

628

Hierarchy Database

618

Group Entity Profile Identifier

624

Data Retriever

630

620

Hierarchy Linker

626

Data Transmitter

Rule Database

Layer 1

Layer 2

Layer 3

Layer 4

Layer 5

Layer 6

Layer 7

MANAGING HIERARCHICAL DATA STRUCTURES FOR ENTITY MATCHING

CROSS-REFERENCE TO RELATED PATENT APPLICATIONS

This application is a Continuation of U.S. patent application Ser. No. 18/824,702, filed Sep. 4, 2024, which is a Continuation of U.S. patent application Ser. No. 17/696,641, filed Mar. 16, 2022, now U.S. Pat. No. 12,105,689, which claims the benefit of priority as a Continuation-In-Part to U.S. patent application Ser. No. 17/409,262, filed Aug. 23, 2021, now U.S. Pat. No. 11,860,909, the contents of each which are incorporated herein by reference in their entireties.

BACKGROUND

The proliferation of storage and network devices enables a large amount of data to be exchanged and stored. A large amount of data allows analysis or predictions that were not feasible before. For example, a big data analysis performed on millions of entity profiles may enable online behavior predictions of consumer behavior for entity profiles of the same group entity through a statistical analysis.

In some instances, a company entity may wish to identify and filter data based on relationships between the data. For instance, given a list of different profiles for different people, it may be useful to determine how those profiles are related to each other and whether they should be considered to be a part of the same group when the profiles or data associated with the profiles is analyzed. Common methods to do so are to group profiles based on manually input attributes in the profiles that match. However, oftentimes when using such methods to group profiles the profiles may be misclassified or grouped into the wrong group because the wrong data may be used to group the profiles, rendering any analysis on the group meaningless.

Furthermore, in instances in which groupings are meant to be used to filter different profiles, such filters may be performed based on hardcoded attributes or values within the profiles (e.g., profiles that share a common value may be filtered together). Computers are often not equipped to filter profiles or otherwise group such profiles based on their relationships without having a common value. This problem may become even more pronounced when the profiles are generated via a manual data entry, which can often produce typographical errors in the profiles that may cause the computers to misclassify the data or otherwise not include profiles to be in the correct grouping.

SUMMARY

At least one aspect of a technical solution to the aforementioned problem is directed to a method. The method may comprise storing, by a processor, a plurality of accounts in a memory, each of the plurality of accounts comprising a plurality of account attribute-value pairs; and generating, by the processor, a hierarchical data structure from the plurality of accounts by: identifying, by the processor, a first set of accounts and a second set of accounts responsive to the first set of accounts and the second set of accounts satisfying a first set of rules; linking, by the processor, the first set of accounts to a first entity profile by inserting a first entity identifier into an entity account attribute-value pair of each account of the first set of accounts and the second set of accounts to a second entity profile by inserting a second entity identifier into an entity account attribute-value pair of each account of the second set of accounts, the first entity profile comprising a first plurality of profile attribute-value pairs and the second entity profile a second plurality of profile attribute-value pairs; and responsive to the first plurality of profile attribute-value pairs and the second plurality of profile attribute-value pairs of the second entity profile satisfying a second set of rules, linking, by the processor, the first entity profile and the second entity profile to a household entity profile by inserting a household identifier into a household attribute-value pair of each account of the first set of accounts and the second set of accounts.

At least one aspect of this technical solution is directed to a system. The system may comprise one or more processors configured by machine-readable instructions to store a plurality of accounts in a memory, each of the plurality of accounts comprising a plurality of account attribute-value pairs; and generate a hierarchical data structure from the plurality of accounts by: identifying a first set of accounts and a second set of accounts responsive to the first set of accounts and the second set of accounts satisfying a first set of rules; linking the first set of accounts to a first entity profile by inserting a first entity identifier into an entity account attribute-value pair of each account of the first set of accounts and the second set of accounts to a second entity profile by inserting a second entity identifier into an entity account attribute-value pair of each account of the second set of accounts, the first entity profile comprising a first plurality of profile attribute-value pairs and the second entity profile a second plurality of profile attribute-value pairs; and responsive to the first plurality of profile attribute-value pairs and the second plurality of profile attribute-value pairs of the second entity profile satisfying a second set of rules, linking the first entity profile and the second entity profile to a household entity profile by inserting a household identifier into a household attribute-value pair of each account of the first set of accounts and the second set of accounts.

At least one aspect of this technical solution is directed to a non-transitory computer-readable storage medium having instructions embodied thereon, the instructions being executable by one or more processors to perform a method. The method may comprise storing a plurality of accounts in a memory, each of the plurality of accounts comprising a plurality of account attribute-value pairs; and generating a hierarchical data structure from the plurality of accounts by: identifying a first set of accounts and a second set of accounts responsive to the first set of accounts and the second set of accounts satisfying a first set of rules; linking the first set of accounts to a first entity profile by inserting a first entity identifier into an entity account attribute-value pair of each account of the first set of accounts and the second set of accounts to a second entity profile by inserting a second entity identifier into an entity account attribute-value pair of each account of the second set of accounts, the first entity profile comprising a first plurality of profile attribute-value pairs and the second entity profile a second plurality of profile attribute-value pairs; and responsive to the first plurality of profile attribute-value pairs and the second plurality of profile attribute-value pairs of the second entity profile satisfying a second set of rules, linking the first entity profile and the second entity profile to a household entity profile by inserting a household identifier into a household attribute-value pair of each account of the first set of accounts and the second set of accounts.

At least one aspect of a technical solution to the aforementioned problem is directed to a method. The method may comprise storing, by one or more processors, a plurality of entity profiles, each of the plurality of entity profiles associated with a different entity and comprising a plurality of attribute-value pairs; applying, by the one or more processors, a predetermined first set of rules to the plurality of attribute-value pairs of the plurality of entity profiles; identifying, by the one or more processors, a first set of entity profiles that satisfy the predetermined first set of rules based on the first set of entity profiles having a matching first set of attribute-value pairs; applying, by the one or more processor, a predetermined second set of rules to the plurality of attribute-value pairs of the plurality of entity profiles; identifying, by the one or more processors, a second set of entity profiles that satisfy the predetermined second set of rules based on the second set of entity profiles having a matching second set of attribute-value pairs; and updating, by the one or more processors, a first attribute-value pair of the first and second sets of entity profiles by adding a first label to the first attribute-value pair responsive to determining the first set of entity profiles and the second set of entity profiles share a common entity profile, the first label linking the first and second sets of entity profiles.

At least one aspect of this technical solution is directed to a system. The system may comprise one or more hardware processors configured by machine-readable instructions to store a plurality of entity profiles, each of the plurality of entity profiles associated with a different entity and comprising a plurality of attribute-value pairs; apply a predetermined first set of rules to the plurality of attribute-value pairs of the plurality of entity profiles; identify a first set of entity profiles that satisfy the predetermined first set of rules based on the first set of entity profiles having a matching first set of attribute-value pairs; apply a predetermined second set of rules to the plurality of attribute-value pairs of the plurality of entity profiles; identify a second set of entity profiles that satisfy the predetermined second set of rules based on the second set of entity profiles having a matching second set of attribute-value pairs; and update a first attribute-value pair of the first and second sets of entity profiles by adding a first label to the first attribute-value pair responsive to determining the first set of entity profiles and the second set of entity profiles share a common entity profile, the first label linking the first and second sets of entity profiles.

At least one aspect of this technical solution is directed to a non-transitory computer-readable storage medium having instructions embodied thereon, the instructions being executable by one or more processors to perform a method. The method may comprise storing a plurality of entity profiles, each of the plurality of entity profiles associated with a different entity and comprising a plurality of attribute-value pairs; applying a predetermined first set of rules to the plurality of attribute-value pairs of the plurality of entity profiles; identifying a first set of entity profiles that satisfy the predetermined first set of rules based on the first set of entity profiles having a matching first set of attribute-value pairs; applying a predetermined second set of rules to the plurality of attribute-value pairs of the plurality of entity profiles; identifying a second set of entity profiles that satisfy the predetermined second set of rules based on the second set of entity profiles having a matching second set of attribute-value pairs; and updating a first attribute-value pair of the first and second sets of entity profiles by adding a first label to the first attribute-value pair responsive to determining the first set of entity profiles and the second set of entity profiles share a common entity profile, the first label linking the first and second sets of entity profiles.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 2 is an illustration of sets of rules for household entity generation, in accordance with an implementation;

DETAILED DESCRIPTION

Figure 1:
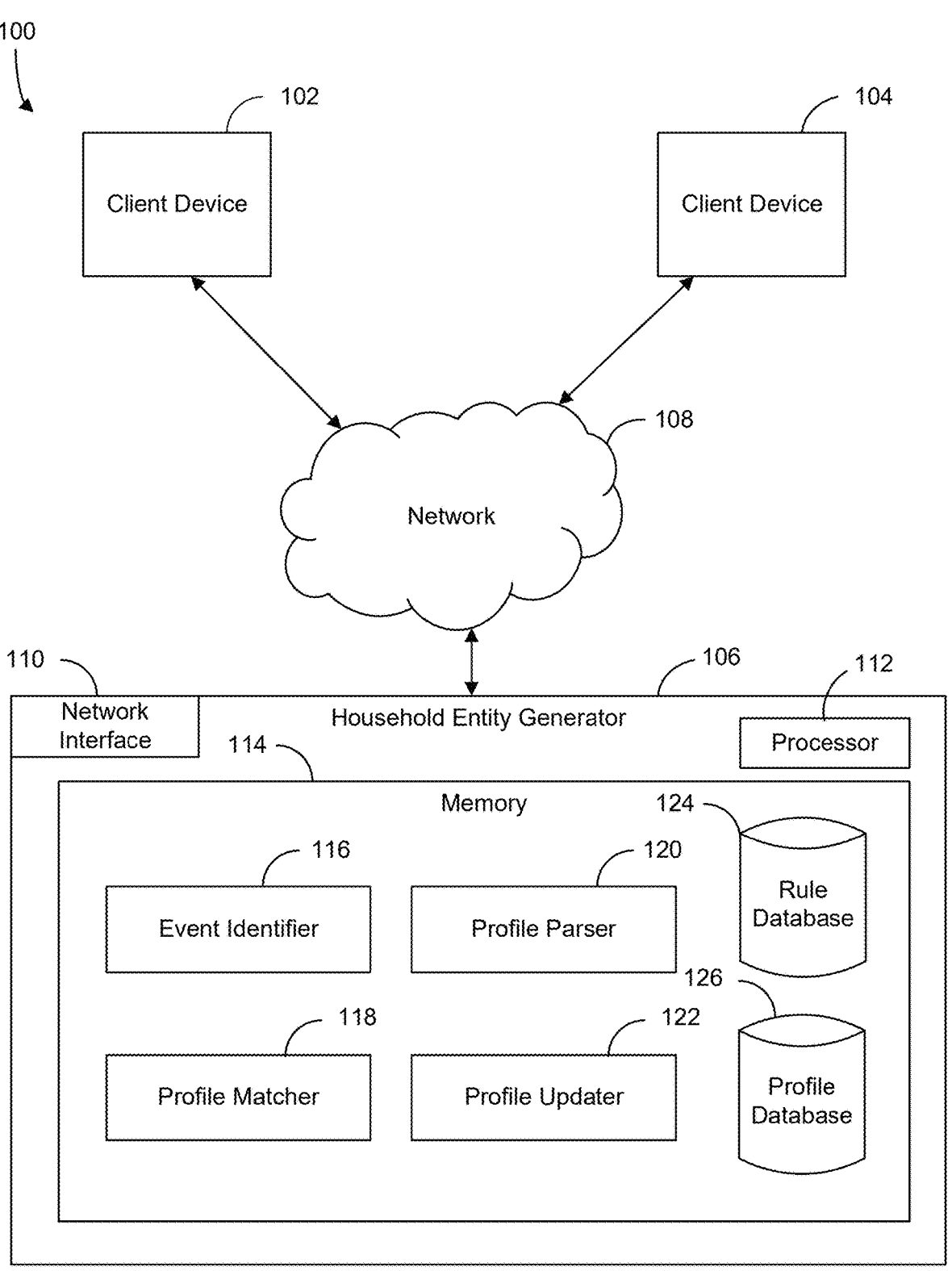
FIG. 1 is an illustration of a system for household entity generation, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

As previously mentioned, computers are liable to misclassify data into different groupings when filtering the data, especially when such classifications rely on data that is manually input and likely to include typographical errors. When computers are performing these classifications based on different relationships between the computer data, such as identifying profiles that are owned or otherwise associated with (e.g., store data for) different entities that are a part of the same household, this problem can become even more pronounced given the amount of data that is stored in each profile (e.g., a computer may inadvertently match different entity profiles into the same grouping if they have one value in common (such as a common first name), despite the profiles not being related). Computers will often rely only on pre-stored data when creating different entity profile groupings without the capability to identify groupings of entity profiles that do not share a common attribute. For instance, a computer may easily group two profiles together that share a matching grouping attribute, but the computer may not be able to group the profiles together if the value of the grouping attribute is missing from one or both of the profiles. Accordingly, when an operator attempts to filter different entity profiles based on different groupings to do an analysis, the computer may not include every entity that should be included in the grouping for the analysis. Thus, the analysis may be incomplete or incorrect.

In one example, a user may wish to determine which entity profiles in a database maintained by a banking system correspond to or represent individuals that reside in the same household. A computer not using the methods described herein may simply match the addresses between different entity profiles and determine the matching addresses means the entities belong to the same household. Other computers may store identifiers of the households in the profiles themselves. However, implementing each of these methods may result in an incorrect household identification because individuals are liable to move households (e.g., children may move off to college or leave the house after starting a new job) without updating their profile information. Further, because these attributes are manually input by users, the attributes may not be correct because of a typo or failure to add the household attribute to the profiles.

Implementations of the systems and methods discussed herein overcome these technical deficiencies because they provide a method for automatically updating entity profiles with group entity labels. The group entity labels may be values that indicate that entity profiles are profiles for individuals that are associated with or a part of the same group entity (e.g., part of the same household or organization). A computer may evaluate attribute-value pairs of individual entity profiles by comparing the attribute-value pairs against each other. The computer may use a specific set of rules that include combinations of different attribute-value pairs that, upon determined to be a match, cause the computer to determine the individuals are a part of the same group. The computer may update the individuals' profiles with a value that indicates the group entity. Thus, the profiles may be filtered and/or analyzed as being associated with the same group entity.

In some instances, there may be attribute-value pairs that have different real-world limitations that may cause the pairs to be considered differently when determining whether entity profiles are associated with the same group entity. Continuing with the banking system example, there may be instances in which individuals share the same bank account (e.g., in a joint account). Accordingly, the individuals' entity profiles may each have the same account number in their corresponding account number attribute-value pair. Such attribute-value pairs may be assigned a different set of rules that identify specific attribute-value pairs than other sets of rules because such attribute-value pairs may have real-world characteristics that indicate whether individuals are associated with the same group (e.g., a matching joint account number and last name combination may not be an accurate indicator of whether a father and daughter are a part of the same household because the daughter may have kept the same joint account after moving out of the house). Accordingly, specific attributes may be grouped into different sets of rules than other attributes to help make sure entity profiles are not incorrectly matched together. These different sets of rules may later be synthesized together based on a common entity profile to build out the entity profiles that are associated with the same group entity, thereby improving the accuracy of the entity profiles that are associated with the group entity.

Another advantage to splitting the rules into different sets based on the attributes of the rules is to avoid misidentifying a group of entity profiles that is too large. For instance, if a computer is attempting to identify entity profiles of individuals that reside in the same household, the computer may seek to avoid identifying large public group entities that may share common characteristics such as addresses, but may not be considered a household (e.g., a jail or a college dormitory). The computer may set thresholds on the different sets of rules, determine the number of entity profiles that matched each other based on each set of rules, and determine whether the number exceeds either threshold. If the computer identifies a set of rules with a number of entity profiles that exceeds a threshold, the computer may determine it is unclear whether the entity profiles are associated with the same household and the computer may not group them together (e.g., not update the respective entity profiles with a grouping identifier). The computer may compare the number of entity profiles that were identified as matching based on both sets of rules to the thresholds and either only group the entity profiles together that match based on a set of rules that did not exceed a threshold or not group any group of entity profiles together for a group entity if one of the sets exceeds a threshold. Thus, the computer may accurately group the entity profiles together for a user seeking to filter entity profiles by group entity and avoid inaccurate groupings.

Yet another advantage to splitting the rules into different sets based on the attributes of the rules is to allow the system to accurately identify large households. For example, as described above, the system may be configured to avoid grouping entity profiles into group entities that are too large to be considered a household by setting a maximum entity profile threshold for each set of rules. While this may help avoid misclassifying entity profiles into improper households, it may also cause for the system to fail to identify large households that happen to have a number of entity profiles that are a part of the household that would be filtered out based on the thresholds. Splitting the rules into different sets may allow for the system to apply the thresholds to the different sets to filter out improper households, but not set any thresholds to the sets of entity profiles that have been synthesized together (e.g., sets of entity profiles from the different sets of rules that were synthesized based on the sets having a common entity profile). In this way, the system may accurately identify households that would otherwise generally be considered to be too large.

Furthermore, one advantage of avoiding inaccurate groupings is it improves processing efficiency and lessens the data storage requirements for processing and storing entity profiles. For instance, when attempting to analyze entity profiles based on their groupings (whether it is just counting the number of entity profiles that are in particular groups, filtering the entity profiles based on the grouping, or identifying the online actions of entity profiles of the groups), a computer may not use the processing resources to process the data of improper group entities. Further, different group entities may have profiles that may be stored in memory and have storage requirements. Avoiding improper entity profile groupings may lessen the number of group entity profiles a computer needs to store in memory. Thus, by implementing the systems and methods described herein, a computer may have more memory and processing resources to process applications that the computer may execute.

FIG. 1 illustrates an example system 100 for household entity generation, in some embodiments. In brief overview, system 100 can include two client devices 102 and 104 that communicate with a household entity generator 106 over a network 108. These components may operate together to identify different entity profiles that can be grouped together and update the entity profiles based on the groupings. System 100 may include more, fewer, or different components than shown in FIG. 1. For example, there may be any number of client devices, computers that make up or are a part of household entity generator 106 or networks in system 100.

Client devices 102 and 104 and/or household entity generator 106 can include or execute on one or more processors or computing devices and/or communicate via network 108. Network 108 can include computer networks such as the Internet, local, wide, metro, or other area networks, intranets, satellite networks, and other communication networks such as voice or data mobile telephone networks. Network 108 can be used to access information resources such as web pages, websites, domain names, or uniform resource locators that can be presented, output, rendered, or displayed on at least one computing device (e.g., client device 102 or 104), such as a laptop, desktop, tablet, personal digital assistant, smartphone, portable computers, or speaker. For example, via network 108, client devices 102 and 104 can access entity profiles that are stored on household entity generator 106.

Each of client devices 102 and 104 and/or household entity generator 106 can include or utilize at least one processing unit or other logic devices such as a programmable logic array engine or a module configured to communicate with one another or other resources or databases. The components of client devices 102 and 104 and/or household entity generator 106 can be separate components or a single component. System 100 and its components can include hardware elements, such as one or more processors, logic devices, or circuits.

Household entity generator 106 may comprise one or more processors that are configured to analyze and update entity profiles based on the entity profiles corresponding to individuals that are a part of the same group (e.g., reside in the same household). Household entity generator 106 may comprise a network interface 110, a processor 112, and/or memory 114. Household entity generator 106 may communicate with client devices 102 and 104 via network interface 110. Processor 112 may be or include an ASIC, one or more FPGAs, a DSP, circuits containing one or more processing components, circuitry for supporting a microprocessor, a group of processing components, or other suitable electronic processing components. In some embodiments, processor 112 may execute computer code or modules (e.g., executable code, object code, source code, script code, machine code, etc.) stored in memory 114 to facilitate the activities described herein. Memory 114 may be any volatile or non-volatile computer-readable storage medium capable of storing data or computer code.

Memory 114 may include an event identifier 116, a profile matcher 118, a profile parser 120, a profile updater 122, a rule database 124, and/or a profile database 126, in some embodiments. In brief overview, components 116-126 may cooperate to store entity profiles in profile database 126 that are accessible to different individuals, detect the occurrence of an event that causes components 118-126 to identify groupings of entity profiles, identify entity profiles that match and are associated with the same group entity based on one or more sets of rules, filter out any matched entity profiles that may not be associated with a group entity, and update the profiles according to the matched group entity. In some embodiments, the components 116-126 may generate new group profiles based on new matches and store the group profiles in profile database 126 such that the group profiles may be analyzed based on the entity profiles that are associated with the respective group profiles.

Household entity generator 106 may store entity profiles in profile database 126. Entity profiles may be accounts for different individuals such as bank account, credit card accounts, user profiles with different websites, etc., or profiles that household entity generator 106 generates for individuals using data from such accounts. The entity profiles may include attribute-value pairs that each include a different attribute and a value for the attribute. For example, the entity profiles may include attribute-value pairs for first name, last name, full name, address, phone number, cell phone number, home phone number, tax identification number, street name, zip code, city, state, account number, household identification number, group entity number, company identification number, etc. Household entity generator 106 may initially store the entity profiles with attribute-value pairs with blank values in the data structures for the respective entity profiles. Household entity generator 106 may then add values to the attribute-value pairs as household entity generator 106 receives inputs (e.g., user inputs) indicating the values. Household entity generator 106 may add the values to the attribute-value pairs by updating the respective data structures with the values.

Profile database 126 may include one or more databases (e.g., databases in a distributed system). Profile database 126 may store profiles for different individual entities (e.g., individual people) and/or group entities (e.g., companies, households, organizations, etc.). The individual entity profile may be referred to as entity profiles or individual entity profiles and the group entity profiles as group entity profiles. The entity profiles may be stored as data structures with one or more attribute-value pairs as described above. The group entity profiles may similarly be stored as data structures with attribute-value pairs (e.g., name, address, phone number, number of members (e.g., employees), names of the members, number of people in the household, type of business, etc.). The different profiles that are stored in profile database 126 may be updated over time as household entity generator 106 either receives new values for the profiles or determines values for profiles.

Event identifier 116 may comprise programmable instructions that, upon execution, cause processor 112 to identify or detect a profile refresh event occurred that causes components 118-122 to analyze and update entity profiles in profile database 126. A profile refresh event may be any event that causes event identifier 116 to evaluate the entity profiles that are stored in memory 114 of household entity generator 106 to determine whether they are associated with a particular group entity. Profile refresh events may be stored rules in memory 114 that cause household entity generator 106 to evaluate the entity profiles. Examples of profile refresh events may include detecting a user input at a user interface (e.g., detecting a selection of a profile refresh button), detecting a time period (e.g., a predetermined time period) has passed since the last instance household entity generator 106 evaluated the entity profiles, detecting the addition of a new entity profile to memory 114, detecting the number of entity profiles stored in memory 114 exceeds a threshold, detecting a number of entity profiles have been added to memory 114 since the last instance household entity generator 106 evaluated the entity profiles, etc. In some embodiments, household entity generator 106 may evaluate the different rules of the profile refresh events over time and/or each time household entity generator 106 adds an entity profile to memory 114.

Profile matcher 118 may comprise programmable instructions that, upon execution, cause processor 112 to apply sets of rules from rule database 124 to the profiles of profile database 126 after event identifier 116 detects a profile refresh event. Rule database 124 may be a relational database that stores any number of rules that can be used to match entity profiles together. For instance, profile matcher 118 may apply a first set of rules from rule database 124 to the attribute-value pairs of the entity profiles to identify entity profiles with specific sets of matching attribute-value pairs. The first set of rules may include matching rules for one or more attribute-value pairs (e.g., entity profiles may be a match between each other for a rule if a specific set of attribute-value pairs match). For instance, one rule may indicate two profiles are a match between each other if they have a match between the last name, street number, street name, and zip code attribute-value pairs. Another rule may indicate two profiles are a match if the profiles have matching last name, street number, city, and state attribute-value pairs. Yet another rule may account for last names with more than one token (e.g., name) and may indicate a match if they have at least one matching token in the last name attribute-value pair and a match between the street number, street name, and zip code attribute-value pairs. The first set of rules may include any number of rules for any attributes.

In some embodiments, the rules may specify that the attribute-value pairs are a match if the values of the attribute-value pairs do not exactly match, but instead only approximately match. For instance, some rules may specify that last names may be a fuzzy match if they match according to a phonetic function (e.g., a phonetic hashing function). Profile matcher 118 may apply such rules by applying the phonetic hashing function to each last name attribute-value pair of the entity profiles and determine matches between the resulting hashes to be a fuzzy match. Some rules may specify that attribute-value pairs are a fuzzy match if they are a match within a threshold as determined using an edit distance function (e.g., Levenshtein or Cosine Similarity). Profile matcher 118 may apply the edit distance function between corresponding attribute-value pairs and determine how many changes would need to occur before the values match. Profile matcher 118 may compare the number of changes to a threshold (e.g., a predetermined threshold). Profile matcher 118 may determine any values with a number of changes below the threshold are a match and values with a number of changes above the threshold are not a match. In some embodiments, the value of the threshold may differ depending on the length of the value (e.g., the number of characters of the value). For instance, profile matcher 118 may determine longer street names correspond to higher thresholds. This may be beneficial because the longer the value, the higher the chance for any typographical errors in the name. Rules may use phonetic functions and/or edit distance functions to determine matches for any attributes. In some embodiments, profile matcher 118 may use phonetic functions and/or edit distance functions to determine exact matches.

In some embodiments, individual rules may include a combination of exact matches and fuzzy matches for different attributes. For instance, one rule may indicate two entity profiles are a match if the last name and street name attribute-value pairs are fuzzy matches (e.g., a fuzzy match based on a phonetic function and/or an edit distance function) and the street number and city and state attribute-value pairs are exact matches. Another rule may indicate two profiles are a match if the same attributes are all fuzzy matches. Yet another rule may indicate two profiles are a match if the same attributes are all exact matches. The rules may have any combination of exact and/or fuzzy matches for any combination of attribute-value pairs.

In some embodiments, the first set of rules may be divided into different subsets of rules. The first set of rules may be divided based on the attribute-value pairs that are included in the rules. For instance, one subset of rules may include different variations of attribute-value pairs that each include a last name attribute-value pair (e.g., an exact matching last name, a fuzzy matching last name, or a last name inclusion). Another set of rules may each include a phone number attribute-value pair (e.g., an exact or fuzzy home and/or cell phone number). Yet another set of rules may each include an email attribute-value pair. Thus, Profile matcher 118 may be able to divide the matching sets of entity profiles based on the types of attribute-value pairs that match that each may have different levels of contributions that indicate whether the entity profiles are associated with the same group entity.

By applying the first set of rules to the attribute-value pairs of the entity profiles, profile matcher 118 may determine if the entity profiles are associated with a common group entity, such as a household (e.g., the individuals that correspond to the entity profiles are members of the same household). Profile matcher 118 may identify any entity profiles that profile matcher 118 determines to be a match as candidate profiles for being associated with the same group entity.

In some embodiments, profile matcher 118 may erase or delete any pre-stored group entity labels that were previously stored in the entity profiles before applying the first set of rules to the entity profiles. For instance, the households of different individuals may change over time as people move from and/or are added to different households. Upon moving households, the individuals may not update their household information in their entity profiles. Instead, the individuals may update their other information, such as their new address and/or phone number. Accordingly, profile matcher 118 may need to cleanse and refresh the household identifiers for all entity profiles that are stored in memory 114 upon detecting each profile refresh event (e.g., using a batch processing technique). By doing so, profile matcher 118 may ensure the entity profiles stay up-to-date and that the entity profiles do not contain stale or incorrect data.

In some embodiments, before applying the first set of rules to the entity profiles, profile matcher 118 may use a normalization technique on their attribute-value pairs. For example, profile matcher 118 may normalize five attributes: last name, address, phone number, email, and/or joint account number. An example of such normalization may include normalizing last names that have composite tokens that are connected by a hyphen (e.g., Aranda-Gonzalez). Profile matcher 118 may replace the hyphen with a white space. Another example of such normalization may include unifying all zip codes to five digits by converting any zip code strings with nine digits to five-digit strings with the remaining digits replaced with null values. Normalization techniques may help avoid variations with the attributes (e.g., avoid instances where one entity profile includes a composite last name and another entity profile has the otherwise same last name but without the hyphen). Any normalization technique may be used to normalize any attribute-value pairs.

Profile matcher 118 may label the entity profiles according to the rules that caused the profiles to be a match. Profile matcher 118 may do so in response to profile matcher 118 identifying at least one pair of entity profiles that match according to the first set of rules. For instance, each rule may correspond to a different label that may have a stored association (e.g., a relationship in rule database 124) with the rule. The first set of rules may have labels such as 1, 1.1, 1.2, 1.3, 1.4, etc. Upon identifying entity profiles that match, profile matcher 118 may identify the labels of the rules that caused the entity profiles to match. Profile matcher 118 may retrieve the labels and update the entity profiles with the retrieved labels to indicate the match (e.g., update the entity profiles by adding the labels to one or more intermediary label attribute-value pairs of the profiles). Thus, profile matcher 118 may identify the candidate entities that may be associated with a household by labeling the entity profiles with the matching labels.

In some embodiments, profile matcher 118 may apply labels to the matching entity profiles based on the different subsets of rules. For instance, each subset of rules may have a different initial value associated with the subset (e.g., one subset may include the labels 1, 1.1, 1.2, 1.3, etc., and another subset may include the labels 2, 2.1, 2.2, 2.3, 2.4, etc.). Profile matcher 118 may retrieve the labels associated with the different subsets and update the matching entity profiles based on the labels to indicate the subsets of the first set of rules that caused the entity profiles to match between each other. Profile parser 120 may then determine if the different candidate entity profiles may be updated with a group entity label.

Profile parser 120 may comprise programmable instructions that, upon execution, cause processor 112 to determine if the candidate profiles that profile matcher identifies can be updated with a group entity label. Profile parser 120 may identify the number of profiles that are associated with the same group entity. To do so, profile parser 120 may synthesize the entity profiles based on the matching entity profiles sharing a common entity profile. For instance, profile parser 120 may determine entity profile A matches entity profile B and entity profile B matches entity profile C. Because the matches between entity profiles A and B and entity profiles B and C share a common entity profile (e.g., entity profile B), profile parser 120 may determine entity profiles A, B, and C are candidate entity profiles for the same group entity. Continuing with this example, entity profiles C and D may be a match, entity profiles E and F may be a match, and entity profiles F and G may be a match. Because entity profiles A, B, and C share a common entity profile with the match between entity profiles C and D, entity profile D may be added to the group of A, B, and C as a candidate entity profile for the same group entity. Meanwhile, entity profiles E, F, and G may be candidate entity profiles for another group entity because entity profile F is a common entity profile between the two matches and the entity profiles do not share a match with entity profiles A, B, C, and D. By synthesizing entity profiles in this way, profile parser 120 may identify sets of entity profiles that satisfy the first set of rules for different group entity based on the sets of entity profiles having matching attribute-value pairs.

Profile parser 120 may generate a list for each group entity that includes the candidate entity profiles for the group entity. Profile parser 120 may maintain a counter for each list and increment the counters for each entity profile on the list. Profile parser 120 may determine the number of candidate entity profiles that are associated with each group entity as the count of the counter.

Profile parser 120 may determine if the number of candidate entity profiles of a set of entity profiles exceeds a threshold. The threshold may be a defined threshold (e.g., 4, 5, 6, 7, 8, 9, etc.). Profile parser 120 may compare the number of candidate entities profiles to the threshold and determine if the number exceeds the threshold. Advantageously, by doing so, profile parser 120 may avoid incorrectly assigning a group entity label to entity profiles. For instance, if profile parser 120 is grouping the entity profiles into individual households, profile parser 120 would not include public areas (e.g., jails or college dormitories) as households that may result in a number of entity that exceeds the threshold.

If profile parser 120 identifies a set of entity profiles for a group entity that exceeds the threshold, profile parser 120 may discard the labels on the set of entity profiles. Profile parser 120 may discard the labels by removing the intermediary labels from the entity profiles that indicate the entity profiles match, leaving the intermediary label and group entity attribute-value pairs for the entity profiles blank. In some embodiments, in instances in which the entity profiles previously had a group entity label in the group entity attribute-value pair, profile parser 120 may remove the group entity label from the attribute-value pair. In embodiments in which profile parser 120 cleanses group entity labels prior to applying the first set of rules, profile parser 120 may discard a previous group entity label from an entity profile during the cleansing and leave the group entity attribute-value pair blank upon refreshing the group entity attribute-value pair labels for the entity profiles. This may occur when profile parser 120 has more data for other entity profiles that causes another subset of entity profiles to match the first set of entity profiles and the match causes the first set of entity profiles to exceed the threshold after synthesis.

Profile matcher 118 may apply a second set of rules to the entity profiles. The second set of rules may be similar to the first set of rules, but include a distinct set of attribute-value pairs in the set. For example, each rule in the second set of rules may at least include an account number attribute-value pair that must exactly match between the different entity profiles for the rule to be satisfied. The rules may otherwise have other attribute-value pairs that may either be a fuzzy match or an exact match.

In some embodiments, the second set of rules may be separate from the first set of rules because the attribute-value pair that is common to the second set of rules may be retrieved from another data source (e.g., another computer or database). For instance, while the first set of rules may only include or reference attribute-value pairs that are stored in the data structures of the entity profiles, the second set of rules may include an attribute-value pair that is common across the second set of rules that is stored in another data structure, such as a database or table that stores values for the attribute-value pair. Continuing with the example above, the account number attribute-value pair for the entity profiles may be aggregated and stored in an account table. The account table may be logically and/or physically separate from the database that stores the entity profiles. The account table may include the account numbers and customer identifiers. The customer identifiers may link the entity profiles to the account numbers as a key. Such a storage configuration may be advantageous given a single customer may have multiple account numbers or customer numbers in a one-to-many relationship (e.g., in instances in which a customer has a savings account and a checking account or a child and a parent have different accounts but the same customer number).

For instance, entity profiles may have a customer identifier attribute-value pair but not an account attribute-value pair. Upon applying the second set of rules to the entity profiles, profile matcher 118 may identify the account numbers for the different entity profiles responsive to the account numbers having stored relationships with the same customer numbers as are stored in the entity profiles. Profile matcher 118 may identify the attribute-value pairs of the entity profiles that correspond to the account numbers (e.g., that have a stored relationship with the same customer number) and apply the second set of rules to the entity profiles similar to the first set of rules by identifying entity profiles with attribute-value pairs including the account number attribute-value pair that match.

Examples of rules of the second set of rules include exact account number, street number, and zip code matches and a fuzzy street name match; exact account number and home phone number matches; exact account number and exact cell phone number matches; and exact account number and email matches. The second set of rules may include account number and any combination or variation of attribute-value pairs that match for the rules to be satisfied.

Profile matcher 118 may label the candidate entity profiles of the second set of rules according to the rules that caused the entity profiles to match. Profile matcher 118 may do so in response to profile matcher 118 identifying at least one set of entity profiles that match according to the first set of rules. For instance, each rule of the second set of rules may correspond to a different label that has a stored association with the rule. The second set of rules may have labels such as 3, 3.1, 3.2, 3.3, 3.4, etc. Such labels may be sequential to the last label of the first set of rules or subset of rules (e.g., if the first set of rules includes the labels 1, 1.1, and 1.2, the second set of labels may include the labels 2, 2.1, and 2.2). Upon identifying entity profiles that match according to the second set of rules, profile matcher 118 may identify the labels of the rules that caused the entity profiles to match. Profile matcher 118 may retrieve the labels and update the entity profiles with the retrieved labels to indicate the match. Thus, profile matcher 118 may identify the candidate entities that may be associated with a group entity by labeling the entity profiles with the matching labels.

In some embodiments, similar to the first set of rules, profile matcher 118 may apply labels to the matching entity profiles based on the different subsets of the second set of rules. For instance, each subset of rules may have a different initial value associated with the subset. The labels may be sequential to the last label of the first set of rules or subset of rules (e.g., if the last subset of labels of the first set of rules includes the labels 2, 2.1, and 2.2, the first subset of the second subset of rules may include the labels 3, 3.1, and 3.2). Profile matcher 118 may retrieve the labels associated with the different subsets and update the matching entity profiles based on the labels to indicate the subsets of the second set of rules that caused the entity profiles to match between each other.

Profile parser 120 may identify the number of profiles that are associated with the same group entity. Profile parser 120 may do so in a similar manner to how profile parser 120 identified the number of profiles that are associated with the same group entity for the first set of rules. For instance, profile parser 120 may identify groups of matching entity profiles that share a common entity profile. One such grouping may be a second set of entity profiles. Profile parser 120 may identify any number of such groups. For each group, profile parser 120 may maintain a counter that indicates the number of entity profiles in the group. The count of the counter may indicate the number of entity profiles of the group.

For the second set of entity profiles, profile parser 120 may determine whether the number of entity profiles for a group entity exceeds a threshold. The threshold may be a defined threshold (e.g., 4, 5, 6, 7, 8, 9, etc.). Profile parser 120 may compare the number of candidate entities profiles to the threshold and determine if the number exceeds the threshold. Advantageously, by doing so, profile parser 120 may avoid incorrectly assigning a group entity label to entity profiles similar to how profile parser 120 avoided incorrectly assigning group entity labels to entity profiles for the second set of rules. Profile parser 120 may similarly compare any number of groups or sets of entity profiles to a threshold.

If profile parser 120 identifies a set of candidate entity profiles for a group entity that exceeds the threshold, profile parser 120 may discard the labels on the candidate entity profiles for the group entity. Profile parser 120 may discard the labels similar to how profile parser 120 discards labels for the first set of rules as described above (e.g., fail to update the entity profile attribute-value pair of an entity profile, remove a value for a group entity attribute-value pair from the entity profiles, remove the intermediary labels from the entity profiles, etc.).

Profile updater 122 may comprise programmable instructions that, upon execution, cause processor 112 to update the entity profiles that have been matched with a group entity with a group entity label. To do so, profile updater 122 may determine if there are any entity profiles that are associated with a group entity for which their labels have not been discarded. For instance, profile updater 122 may determine if there are any matching entity profiles that were identified using the first set of rules or the second set of rules that were not labeled with a group entity that exceeds a threshold. Responsive to profile updater 122 determining no such entity profiles exist (e.g., all matching entity profiles were discarded or no matching entity profiles were found), profile updater 122 may generate a record (e.g., a file, document, table, listing, message, notification, etc.) indicating no group entities could be identified. Profile updater 122 may transmit the record to a client device to be displayed on a user interface. By doing so, profile updater 122 may inform an administrator that the entity profiles could not be grouped into different group entities.

However, responsive to determining there is at least one matching profile that has not been discarded, profile updater

122 may update the entity profiles according to the group entities with which they are associated. Profile updater 122 may update the entity profiles of the different sets of entity profiles with group entity labels that indicate the group entities with which they are associated. For example, upon determining there is a set of entity profiles that matches and/or has been synthesized together, profile updater 122 may generate a numeric, alphabetic, or alphanumeric string as a group entity label and add the group entity label to each of the entity profiles of the set (e.g., add a group entity label to the group entity attribute-value pair of each of the entity profiles). Profile updater 122 may generate the group entity label using a random number generator or using data that matches one or a portion of the entity profiles such as a common last name or a common phone number. Profile updater 122 may generate the group entity labels using any method.

In some embodiments, profile updater 122 may generate group entity labels for the entity profiles after synthesizing entity profiles that were identified using the first set of rules and entity profiles that were identified using the second set of rules (e.g., the first and second sets of entity profiles). Profile updater 122 may synthesize the two sets of entity profiles based on the two sets of entity profiles sharing a common entity profile (e.g., the same entity profile is in each set). Profile updater 122 may compare the entity profiles in each set of entity profiles and identify sets with a common entity profile as being associated with the same group entity. Accordingly, when profile updater 122 updates the different sets of entity profiles with group entity labels, profile updater 122 may update entity profiles that were identified using both sets of rules with the same group entity label. In this way, profile updater 122 may enable profile updater 122 to link entity profiles that were identified by only one set of the rules and entity profiles that were only identified using the other set of rules to the same group entity (and therefore each other).

FIG. 2 is an illustration of sets of rules 200 for household entity generation, in accordance with an implementation. Set of rules 200 may be or represent rules that are stored in rule database 124, shown and described with reference to FIG. 1. Sets of rules 200 may include a first set of rules 202 and a second set of rules 204. First set of rules 202 may include rules that include a common attribute-value pair between each other or that each exclude a specific attribute-value pair. For example, each rule of first set of rules 202 may include a requirement to have at least the exact same last name or a fuzzy matching last name. In another example, by definition, each rule in first set of rules 202 may not include an account number attribute-value pair. This may be particularly advantageous if the excluded attribute-value pair is stored in another data structure from the entity profiles such as account numbers being stored in a global table or database with common customer identification numbers that act as look-up keys that link the account numbers to different entity profiles. In some cases, the different customer identifiers of different entity profiles may correspond to the same account number or vice versa. Accordingly, using the customer identifiers as look-up keys may enable a data processing system (e.g., household entity generator 106) to identify attribute-value pairs for different entity profiles that correspond to the same account number.

First set of rules 202 may include subsets of rules 206, 208, and 210. Each subset of rules 206, 208, and 210 may have a common attribute-value pair within the rules of the respective subset (e.g., each rule of subset of rules 206 may include a last name attribute-value pair, each rule of subset of rules 208 may include a phone number attribute-value pair, and each rule of subset of rules 210 may include a street address attribute-value pair). Such rules may be designed to determine the group entities with which the individual entity profiles are associated.

Furthermore, each subset of rules 206, 208, and 210 may include rules that have a stored relationship with different labels. For instance, the rules of subset of rules 206 may respectively have stored relationships with the labels 1.1, 1.2, and 1.3; the rules of subset of rules 208 may respectively have stored relationships with the labels 2.1, 2.2, and 2.3; and the rules of subset of rules 210 may respectively have stored relationships with the labels 3.1, 3.2, and 3.3. Upon determining two entity profiles match according to one of these rules, the data processing system may retrieve the label for the rule and update the two matching entity profiles with the label. Thus, the data processing system may update the entity profiles to indicate that they have a match and the rule that caused the match.

Second set of rules 204 may include rules that include a common attribute-value pair between each other. In some embodiments, each of second set of rules 204 may include an attribute-value pair that was excluded from first set of rules 204. For instance, each rule of second set of rules 204 may include an account number attribute-value pair. The account number attribute-value pair may have been explicitly excluded from first set of rules 202 because the account number attribute may be likely to cause false matches in combination one or more of the attribute of first set of rules 202.

Second set of rules 204 may include subsets of rules 212 and 214 that identify different types of attribute-value pairs in addition to the account number. For example, the rules of subset of rules 212 may each include an account number attribute-value pair and a phone number attribute-value pair. The rules of subset of rules 214 may each include an account number attribute-value pair and an email attribute-value pair. Each subset may have stored relationships with labels for each rule of the subset similar to first set of rules 202. The data processing system may apply such labels to entity profiles upon determining the entity profiles match according to the rules of respective labels. Thus, the data processing system may store indications of the rules that caused the entity profiles to match.

Figure 3:
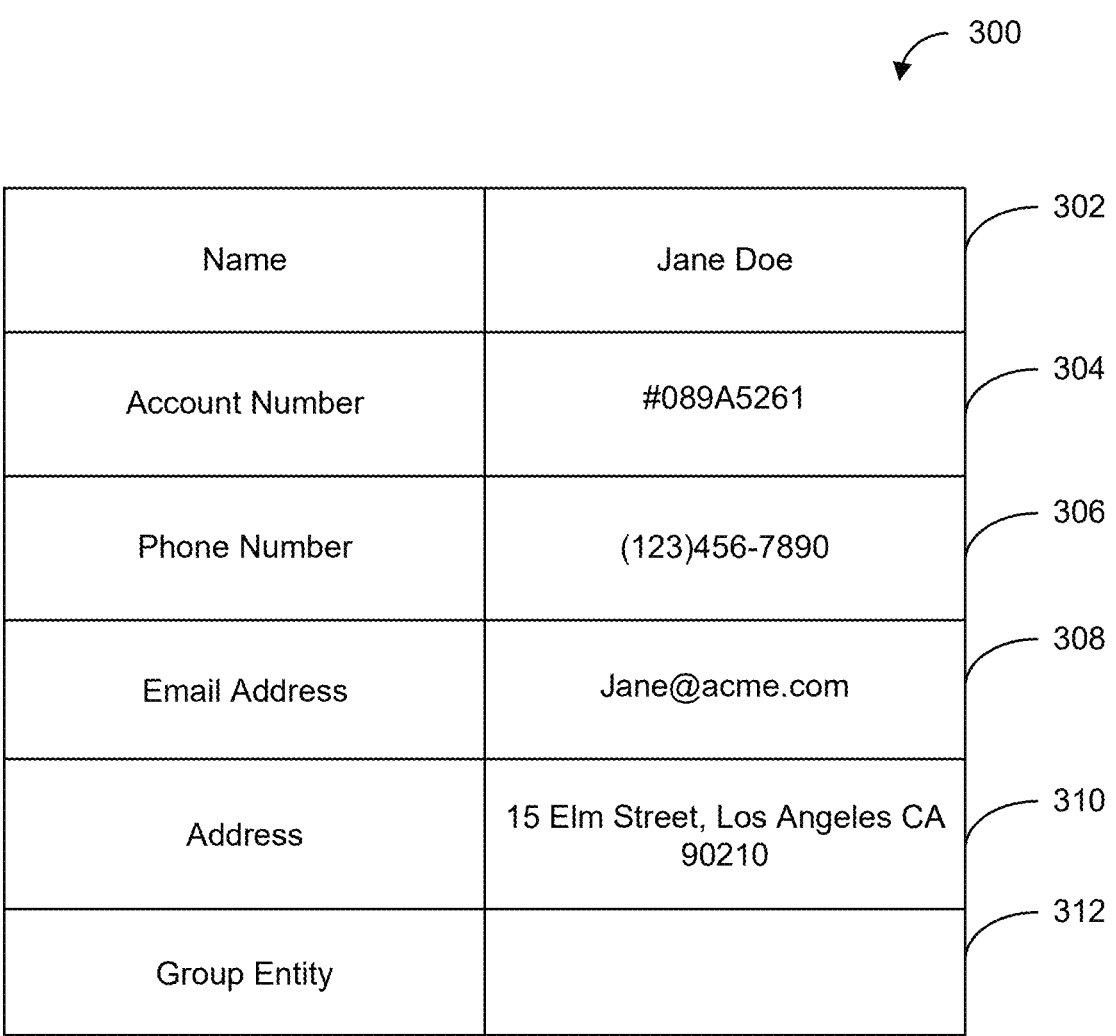
FIG. 3 is an illustration of an example entity profile, in accordance with an implementation.

FIG. 3 is an illustration of an example entity profile 300, in accordance with an implementation. Entity profile 300 may be or include a data structure that contains or stores attribute-value pairs for the individual entity profile 300. As illustrated, entity profile 300 may include a name attribute-value pair 302, an account number attribute-value pair 304, a phone number attribute-value pair 306, an email address attribute-value pair 308, an address attribute-value pair 310, and a group entity attribute-value pair 312. However, entity profiles such as entity profile 300 may include any combination of more or less attribute-value pairs. Each attribute-value pair may include a string identifying the attribute and a value (e.g., a numerical, alphabetical, or alphanumerical value) for the attribute-value pair. Such attribute-value pairs may be stored in a database (e.g., profile database 126) with attribute-value pairs of other entity profiles such that a data processing system (e.g., household entity generator 106) may retrieve the attribute-value pairs to identify group entities that are associated with the individual entity profiles.

Entity profile 300 may not include a value for group entity attribute-value pair 312. This may be the case if a user has not input a value for group entity attribute-value pair or the data processing system has not assigned entity profile 300 to a specific group entity. Upon determining entity profile 300 is associated with a group entity, the data processing system may update group entity attribute-value pair 312 with a value indicating the group entity. The data processing system may refresh (e.g., replace with a new value, remove the value, or keep the value the same) this value at each instance the data processing system determines the group entity with which each entity profile is associated.

Figure 4:
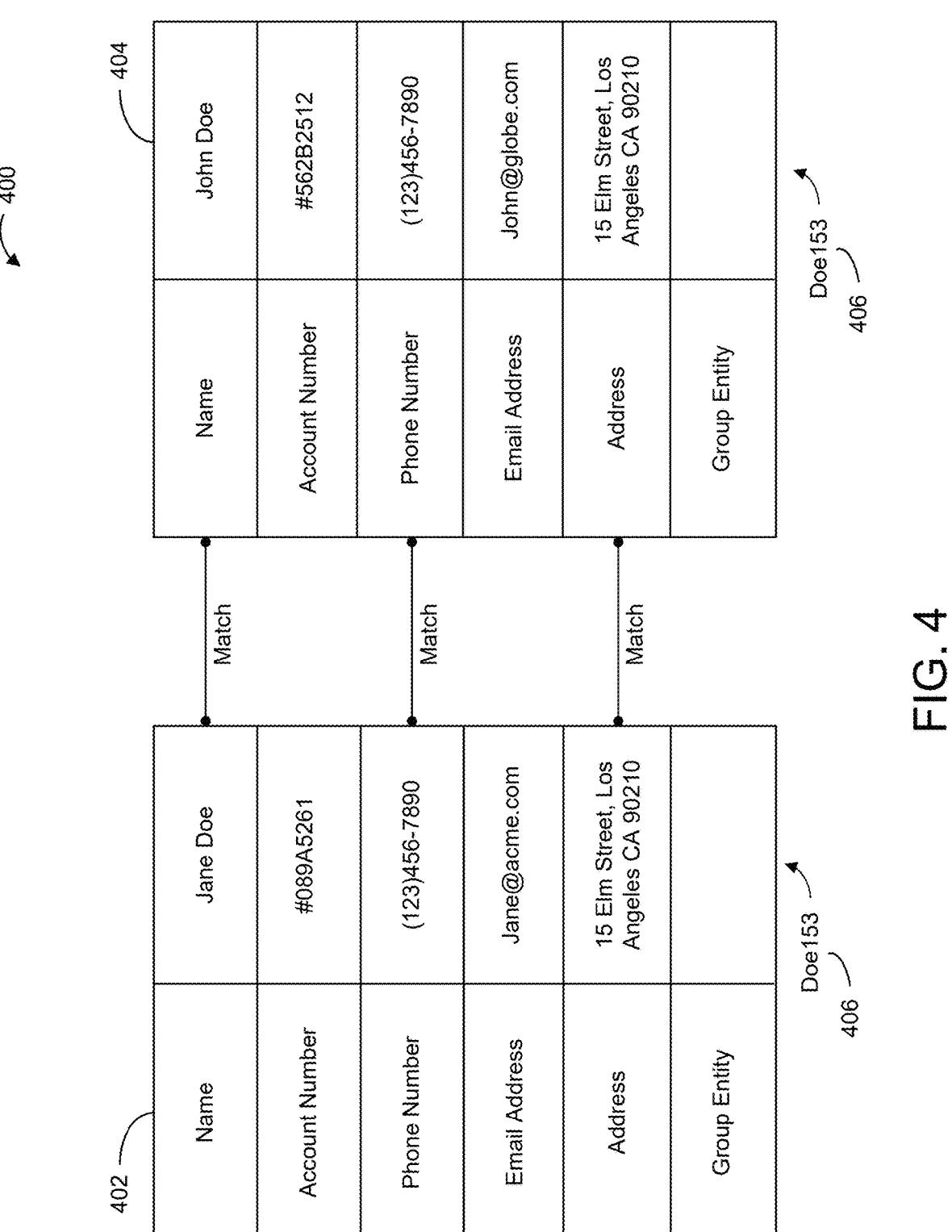
FIG. 4 is an illustration of a comparison between two entity profiles, in accordance with an implementation.

FIG. 4 is an illustration of a comparison 400 between two entity profiles 402 and 404, in accordance with an implementation. A data processing system (e.g., household entity generator 106) may compare entity profiles 402 and 404 by applying one or more sets of rules (e.g., sets of rules 202 and/or 204) to entity profiles 402 and 404. The data processing system may do so by comparing the corresponding attribute-value pairs (e.g., attribute-value pairs of the same type) of entity profiles 402 and 404 between each other and determining whether any of the rules are satisfied based on the comparison. For example, the data processing system may apply a rule that indicates that two entity profiles match if they have the exact same last name, phone number, and address. The data processing system may apply the rule to entity profiles 402 and 404 and determine the rule is satisfied. After determining the rule is satisfied, the data processing system may determine entity profiles are associated with the same group entity and are not a part of a set of entity profiles that exceeds a threshold. Accordingly, the data processing system may update each of entity profiles 402 and 404 with a "Doe153" group entity label 406.

In some embodiments, the data processing system may determine group entity labels, such as the "Doe153" label mentioned above, based on the matching attributes of the matching profiles being labeled. For instance, the data processing system may determine entity profiles 402 and 404 are a match based at least on the last name attribute-value pair "Doe." Accordingly, the data processing system may generate a group entity label of Doc to add to each of entity profiles 402 and 404. The data processing system may select one set of matching attribute-value pairs between matching entity profiles when multiple sets of entity profiles with different matching attribute-value pairs have been synthesized together (e.g., if entity profiles of set A and B and set B and C have been synthesized, the data processing system may select a matching attribute-value pair from set A and B or from B and C to use to create the group entity label). The data processing system may determine group entity labels based on any matching attribute-value pair.

In some instances, when generating group entity labels using the above technique, the data processing system may identify multiple group entities that correspond to the same label (e.g., multiple sets of matching entity profiles with the same matching attribute, such as the last name of Doc). In such instances, the data processing system may increment a counter for each label with the same value and concatenate the count of the counter to the end of the label. For example, if the data processing system had previously identified 152 sets of matching entity profiles that have the value Doc, the data processing system may determine the label for the $153^{rd}$ group entity to be Doc 153. Accordingly, the data processing system may use the data of the matching attribute-value pairs to generate unique group entity labels for each set of matching entity profiles. In some embodiments, the data processing system may generate the group labels using a random number generator.

Figure 5:
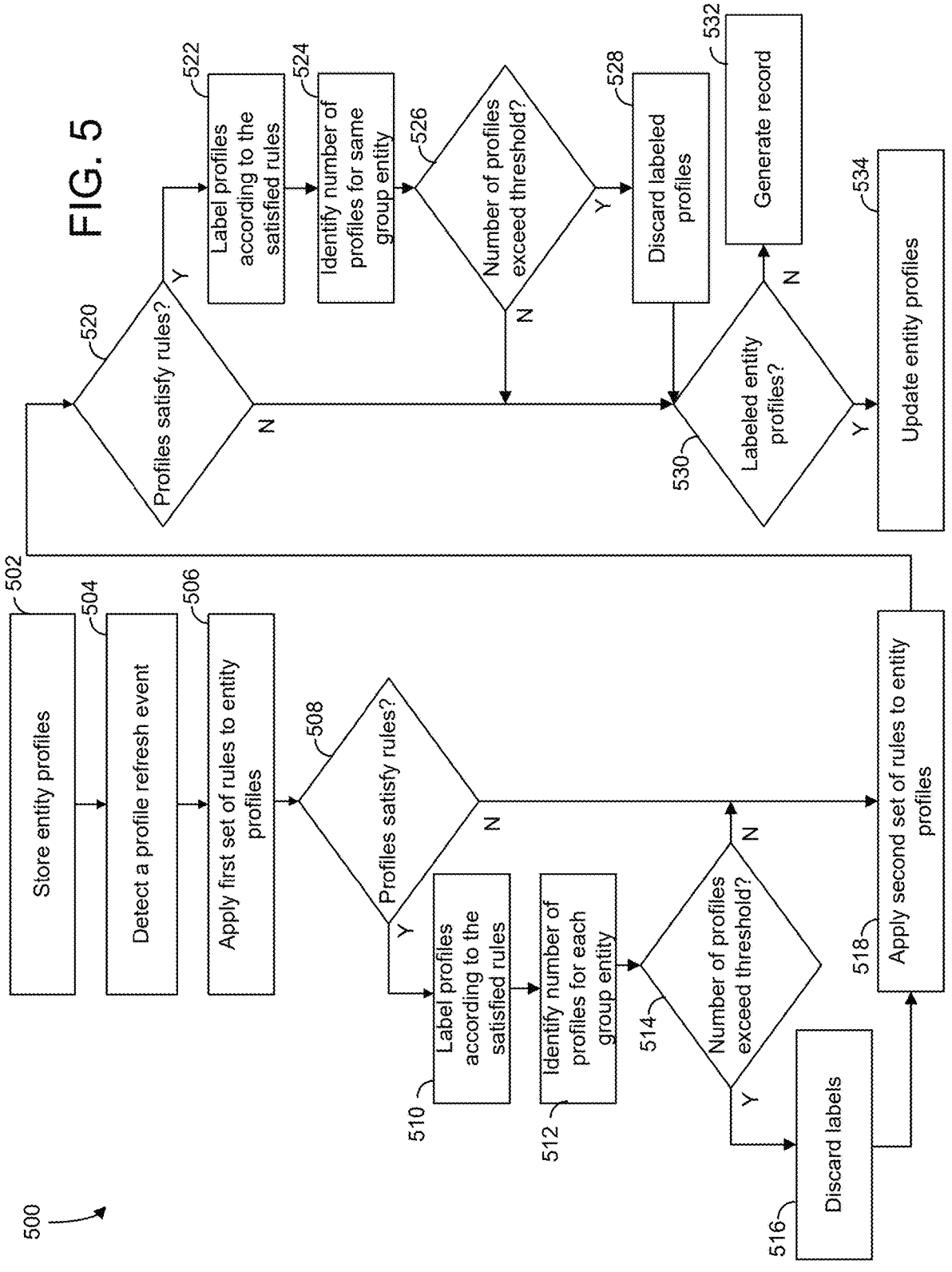
FIG. 5 is an illustration of a method for household entity generation, in accordance with an implementation.

FIG. 5 is an illustration of a method 500 for improved household data generation, in accordance with an implementation. Method 500 can be performed by a data processing system (a client device or a household entity generator 106, shown and described reference to FIG. 1, a server system, etc.). Method 500 may include more or fewer operations and the operations may be performed in any order. Performance of method 500 may enable the data processing system to ingest different entity profiles and correlate the entity profiles with a common group entity (e.g., a household entity). The data processing system may apply different sets of rules to the entity profiles to identify candidate entity profiles that may be associated with individuals of the same group entity. The data processing system may parse the candidate entity profiles to identify entity profiles that are likely not associated with a group entity that meets a predetermined criteria (e.g., a group entity that is not too large). The data processing system may then update the entity profiles to indicate the group entities with which they are associated and/or generate group entity profiles for the group entities. Accordingly, the data processing system may enable the entity profiles to be accurately filtered according to their groups (e.g., based on the entity profiles having matching group entity labels) without relying on a user input to indicate the groups and without misidentifying the entity profiles as being associated with the incorrect group (e.g., misidentifying the entity profiles as being associated with a household when they are located or reside in a jail, dormitory, or another large public space).

At operation 502, the data processing system may store entity profiles. Entity profiles may be accounts for different individuals such as bank account, credit card accounts, user profiles with different websites, etc. The entity profiles may include attribute-value pairs that each include a different attribute and a value for the attribute. The data processing system may initially store the entity profiles with attribute-value pairs with blank values in the data structures for the respective entity profiles. The data processing system may then add values to the attribute-value pairs as the data processing system receives inputs (e.g., user inputs) indicating the values. The data processing system may add the values to the attribute-value pairs by updating the respective data structures with the values.

The data processing system may store the entity profiles in memory, in some cases in a single or multiple databases. The data processing system may store the entity profiles in a database that may include profiles for different individual entities and/or group entities. The entity profiles may be stored as data structures with one or more attribute-value pairs as described above. The group entity profiles may similarly be stored as data structures with attribute-value pairs. The different profiles that are stored in the database may be updated over time as the data processing system either receives new values for the profiles or determines values for profiles.

At operation 504, the data processing system may detect a profile refresh event. A profile refresh event may be any event that causes the data processing system to evaluate the entity profiles that are stored in memory of the data processing system to determine whether they are associated with a particular group entity. Profile refresh events may be stored rules in the data processing system that, upon being satisfied, causes the data processing system to evaluate the entity profiles. In some embodiments, the data processing system may evaluate the different rules of the profile refresh events over time and/or each time the data processing system adds an entity profile to memory. Upon detecting any of these events occurred, the data processing system may perform operations 506-534 to determine whether the entity profiles are associated with group entities and update the entity profiles accordingly.

After detecting a profile refresh event, at operation 508, the data processing system may apply a first set of rules to the entity profiles. The data processing system may apply the first set of rules to the attribute-value pairs of the entity profiles to identify entity profiles with specific sets of matching attribute-value pairs. The first set of rules may include matching rules for one or more attribute-value pairs (e.g., entity profiles may be a match between each other for a rule if a specific set of attribute-value pairs match). For instance, one rule may indicate two profiles are a match between each other if they have a match between the last name, street number, street name, and zip code attribute-value pairs. Another rule may indicate two profiles are a match if the profiles have matching last name, street name, city, and state attribute-value pairs. The first set of rules may include any number of rules for any attributes.

In some embodiments, the rules may specify that the attribute-value pairs are a match if the values of the attribute-value pairs do not exactly match, but instead only approximately match. For instance, some rules may specify that last names may be a fuzzy match if they match according to a phonetic function (e.g., a phonetic hashing function). The data processing system may apply such rules by applying the phonetic hashing function to each last name attribute-value pair of the entity profiles and determine matches between the resulting hashes to be a fuzzy match. Some rules may specify that attribute-value pairs are a fuzzy match if they are a match within a threshold as determined using an edit distance function. The data processing system may apply the edit distance function between corresponding attribute-value pairs and determine how many changes would need to occur before the values match. The data processing system may compare the number of changes to a threshold (e.g., a predetermined threshold). The data processing system may determine any values with a number of changes below the threshold are a match and values with a number of changes above the threshold are not a match. In some embodiments, the value of the threshold may differ depending on the length of the value (e.g., the number of characters of the value). For instance, the data processing system may determine longer street names correspond to higher thresholds. This may be beneficial because the longer the value, the higher the chance for any typographical errors in the name. Rules may use phonetic functions and/or edit distance functions to determine matches for any attributes. In some embodiments, the data processing system may use phonetic functions and/or edit distance functions to determine exact matches.

In some embodiments, individual rules may include a combination of exact matches and fuzzy matches for different attributes. For instance, one rule may indicate two entity profiles are a match if the last name and street name attribute-value pairs are fuzzy matches (e.g., a fuzzy match based on a phonetic function and/or an edit distance function) and the street number and city and state attribute-value pairs are exact matches. Another rule may indicate two profiles are a match if the same attributes are all fuzzy matches. Yet another rule may indicate two profiles are a match if the same attributes are all exact matches. The rules may have any combination of exact and/or fuzzy matches for any combination of attribute-value pairs.

In some embodiments, the first set of rules may be divided into different subsets of rules. The first set of rules may be divided based on the attribute-value pairs that are included in the rules. For instance, one subset of rules may include different variations of attribute-value pairs that each include a last name attribute-value pair (e.g., an exact matching last name, a fuzzy matching last name, or a last name inclusion). Another set of rules may each include a phone number attribute-value pair (e.g., an exact or fuzzy home and/or cell phone number).

By applying the first set of rules to the attribute-value pairs of the entity profiles, the data processing system may determine if the entity profiles are associated with a common group entity, such as a household (e.g., the individuals that correspond to the entity profiles are members of the same household). The data processing system may identify any entity profiles that the data processing system determines to be a match as candidate profiles for being associated with the same group entity.

In some embodiments, the data processing system may erase or delete any pre-stored group entity labels that were previously stored in the entity profiles before applying the first set of rules to the entity profiles. For instance, the households of different individuals may change over time as people move from and/or are added to different households. Upon moving households, the individuals may not update their household information in their entity profiles. Instead, the individuals may update their other information, such as their new address and/or phone number. Accordingly, the data processing system may need to cleanse and refresh the household identifiers for all entity profiles that are stored in memory upon detecting each profile refresh event (e.g., using a batch processing technique). By doing so, the data processing system may ensure the entity profiles stay up-to-date and that the entity profiles do not contain stale or incorrect data.

In some embodiments, before applying the first set of rules to the entity profiles, the data processing system may use a normalization technique on their attribute-value pairs. For example, the data processing system may normalize five attributes: last name, address, phone number, email, and/or joint account number. An example of such normalization may include normalizing last names that have composite tokens that are connected by a hyphen (e.g., Aranda-Gonzalez). The data processing system may replace the hyphen with a white space. Another example of such normalization may include unifying all zip codes to five digits by converting any zip code strings with nine digits to five-digit strings with the remaining digits replaced with null values. Normalization techniques may help avoid variations with the attributes (e.g., avoid instances where one entity profile includes a composite last name and another entity profile has the otherwise same last name but without the hyphen). Any normalization technique may be used to normalize any attribute-value pairs.

At operation 508, the data processing system may determine if any of the entity profiles satisfy any of the first set of rules. For instance, the data processing system may compare the attribute-value pairs of the different entity profiles against each other according to the first set of rules and determine if there are any matching entity profiles that satisfy at least one of the first set of rules. The data processing system may identify any matching entity profiles as candidate profiles that may be associated with the same group entity.

At operation 510, the data processing system may label the entity profiles according to the rules that caused the profiles to be a match. The data processing system may do so in response to the data processing system identifying at least one pair of entity profiles that match according to the first set of rules. For instance, each rule may correspond to a different label that may have a stored association (e.g., a relationship in a relational database) with the rule. The first set of rules may have labels such as 1, 1.1, 1.2, 1.3, 1.4, etc. Upon identifying entity profiles that match, the data processing system may identify the labels of the rules that caused the entity profiles to match. The data processing system may retrieve the labels and update the entity profiles with the retrieved labels to indicate the match. Thus, the data processing system may identify the candidate entities that may be associated with a household by labeling the entity profiles with the matching labels.

In some embodiments, the data processing system may apply labels to the matching entity profiles based on the different subsets of rules. For instance, each subset of rules may have a different initial value associated with the subset (e.g., one subset may include the labels 1, 1.1, 1.2, 1.3, etc., and another subset may include the labels 2, 2.1, 2.2, 2.3, 2.4, etc.). The data processing system may retrieve the labels associated with the different subsets and update the matching entity profiles based on the labels to indicate the subsets of the first set of rules that caused the entity profiles to match between each other.

At operation 512, the data processing system may identify the number of profiles that are associated with the same group entity. To do so, the data processing system may synthesize the entity profiles based on the matching entity profiles sharing a common entity profile. For instance, the data processing system may determine entity profile A matches entity profile B and entity profile B matches entity profile C. Because the matches between entity profiles A and B and entity profiles B and C share a common entity profile (e.g., entity profile B), the data processing system may determine entity profiles A, B, and C are candidate entity profiles for the same group entity. Continuing with this example, entity profiles C and D may be a match, entity profiles E and F may be a match, and entity profiles F and G may be a match. Because entity profiles A, B, and C share a common entity profile with the match between entity profiles C and D, entity profile D may be added to the group of A, B, and C as a candidate entity profile for the same group entity. Meanwhile, entity profiles E, F, and G may be candidate entity profiles for another group entity because entity profile F is a common entity profile between the two matches and the entity profiles do not share a match with entity profiles A, B, C, and D. By synthesizing entity profiles in this way, the data processing system may identify sets of entity profiles that satisfy the first set of rules for different group entity based on the sets of entity profiles having matching attribute-value pairs.

The data processing system may generate a list for each group entity that includes the candidate entity profiles for the group entity. The data processing system may maintain a counter for each list and increment the counters for each entity profile on the list. The data processing system may determine the number of candidate entity profiles that are associated with each group entity as the count of the counter.

At operation 514, the data processing system may determine if the number of candidate entity profiles of a set of entity profiles exceeds a threshold. The threshold may be a defined threshold (e.g., 4, 5, 6, 7, 8, 9, etc.). The data processing system may compare the number of candidate entities profiles to the threshold and determine if the number exceeds the threshold. Advantageously, by doing so, the data processing system may avoid incorrectly assigning a group entity label to entity profiles. For instance, if the data processing system is grouping the entity profiles into individual households, the data processing system would not include public areas (e.g., jails or college dormitories) as households that may result in a number of entity that exceeds the threshold.

If the data processing system identifies a set of entity profiles for a group entity that exceeds the threshold, at operation 516, the data processing system may discard the labels on the set of entity profiles. The data processing system may discard the labels by removing the intermediary labels from the entity profiles that indicate the entity profiles match, leaving the intermediary label and group entity attribute-value pairs for the entity profiles blank. In some embodiments, in instances in which the entity profiles previously had a group entity label in the group entity attribute-value pair, the data processing system may remove the group entity label from the attribute-value pair. In embodiments in which the data processing system cleanses group entity labels prior to applying the first set of rules, the data processing system may discard a previous group entity label from an entity profile during the cleansing and leave the group entity attribute-value pair blank upon refreshing the group entity attribute-value pair labels for the entity profiles. This may occur when the data processing system has more data for other entity profiles that causes another subset of entity profiles to match the first set of entity profiles and the match causes the first set of entity profiles to exceed the threshold after synthesis.

At operation 518, the data processing system may apply a second set of rules to the entity profiles. The second set of rules may be similar to the first set of rules, but include a distinct set of attribute-value pairs in the set. For example, each rule in the second set of rules may at least include an account number attribute-value pair that must exactly match between the different entity profiles for the rule to be satisfied. The rules may otherwise have other attribute-value pairs that may either be a fuzzy match or an exact match.

In some embodiments, the second set of rules may be separate from the first set of rules because the attribute-value pair that is common to the second set of rules may be retrieved from another data source (e.g., another data processing system or another database). For instance, while the first set of rules may only include or reference attribute-value pairs that are stored in the data structures of the entity profiles, the second set of rules may include an attribute-value pair that is common across the second set of rules that is stored in another data structure, such as a database or table that stores values for the attribute-value pair. Continuing with the example above, the account number attribute-value pair for the entity profiles may be aggregated and stored in an account table. The account table may be logically and/or physically separate from the database that stores the entity profiles. The account table may include the account numbers and customer identifiers. The customer identifiers may link the entity profiles to the account numbers as a key. Such a storage configuration may be advantageous given a single customer or entity profile may have multiple account numbers or customer numbers in a one-to-many relationship (e.g., in instances in which a customer has a savings account and a checking account or a child and a parent have different accounts but the same customer number).

For instance, entity profiles may have a customer identifier attribute-value pair but not an account attribute-value pair. Upon applying the second set of rules to the entity profiles, the data processing system may identify the account numbers for the different entity profiles responsive to the account numbers having stored relationships with the same customer numbers as are stored in the entity profiles. The data processing system may identify the attribute-value pairs of the entity profiles that correspond to the account numbers (e.g., that have a stored relationship with the same customer number) and apply the second set of rules to the entity profiles similar to the first set of rules by identifying entity profiles with attribute-value pairs including the account number attribute-value pair that match.

Examples of rules of the second set of rules include exact account number, street number, and zip code matches and a fuzzy street name match; exact account number and home phone number matches; exact account number and exact cell phone number matches; and exact account number and email matches. The second set of rules may include account number and any combination or variation of attribute-value pairs that match for the rules to be satisfied.

At operation 520, the data processing system may determine if any of the second set of rules were satisfied. For instance, the data processing system may retrieve the account numbers for the entity profiles based on the entity profiles and account numbers each having a stored relationship with the same customer number. The data processing system may apply the second set of rules to the account numbers and attribute-value pairs of the entity profiles and determine if there are any matching entity profiles that satisfy at least one of the second set of rules. The data processing system may identify any matching entity profiles as candidate profiles that may be associated with the same group entity.

At operation 522, the data processing system may label the candidate entity profiles of the second set of rules according to the rules that caused the entity profiles to match. The data processing system may do so in response to the data processing system identifying at least one set of entity profiles that match according to the first set of rules. For instance, each rule of the second set of rules may correspond to a different label that has a stored association with the rule. The second set of rules may have labels such as 3, 3.1, 3.2, 3.3, 3.4, etc. Such labels may be sequential to the last label of the first set of rules or subset of rules (e.g., if the first set of rules includes the labels 1, 1.1, and 1.2, the second set of labels may include the labels 2, 2.1, and 2.2). Upon identifying entity profiles that match according to the second set of rules, the data processing system may identify the labels of the rules that caused the entity profiles to match. The data processing system may retrieve the labels and update the entity profiles with the retrieved labels to indicate the match. Thus, the data processing system may identify the candidate entities that may be associated with a group entity by labeling the entity profiles with the matching labels.

In some embodiments, similar to the first set of rules, the data processing system may apply labels to the matching entity profiles based on the different subsets of the second set of rules. For instance, each subset of rules may have a different initial value associated with the subset. The labels may be sequential to the last label of the first set of rules or subset of rules (e.g., if the last subset of labels of the first set of rules includes the labels 2, 2.1, and 2.2, the first subset of the second subset of rules may include the labels 3, 3.1, and 3.2). The data processing system may retrieve the labels associated with the different subsets and update the matching entity profiles based on the labels to indicate the subsets of the second set of rules that caused the entity profiles to match between each other.

At operation 524, the data processing system may identify the number of profiles that are associated with the same group entity. The data processing system may do so in a similar manner to how the data processing system identified the number of profiles that are associated with the same group entity for the first set of rules. For instance, the data processing system may identify groups of matching entity profiles that share a common entity profile. One such grouping may be a second set of entity profiles. The data processing system may identify any number of such groups. For each group, the data processing system may maintain a counter that indicates the number of entity profiles in the group. The count of the counter may indicate the number of entity profiles of the group.

At operation 526, for the second set of entity profiles, the data processing system may determine whether the number of entity profiles for a group entity exceeds a threshold. The threshold may be a defined threshold (e.g., 4, 5, 6, 7, 8, 9, etc.). The data processing system may compare the number of candidate entities profiles to the threshold and determine if the number exceeds the threshold. Advantageously, by doing so, the data processing system may avoid incorrectly assigning a group entity. The data processing system may similarly compare any number of groups or sets of entity profiles to a threshold.

If the data processing system identifies a set of candidate entity profiles for a group entity that exceeds the threshold, at operation 528, the data processing system may discard the labels on the candidate entity profiles for the group entity. The data processing system may discard the labels similar to how the data processing system discards labels for the first set of rules as described above (e.g., fail to update the entity profile attribute-value pair of an entity profile, remove a value for a group entity attribute-value pair from the entity profiles, remove the intermediary labels from the entity profiles, etc.).

At operation 530, the data processing system may determine if there are any entity profiles that are associated with a group entity for which their labels have not been discarded. For instance, the data processing system may determine if there are any matching entity profiles that were identified using the first set of rules or the second set of rules that were not labeled with a group entity that exceeds a threshold. Responsive to the data processing system determining no such entity profiles exist (e.g., all matching entity profiles were discarded or no matching entity profiles were found), at operation 532, the data processing system may generate a record (e.g., a file, document, table, listing, message, notification, etc.) indicating no group entities could be identified. The data processing system may transmit the record to a client device to be displayed on a user interface. By doing so, the data processing system may inform an administrator that the entity profiles could not be grouped into different group entities.

However, responsive to determining there is at least one matching profile that has not been discarded, at operation 534, the data processing system may update the entity profiles according to the group entities with which they are associated. The data processing system may update the entity profiles of the different sets of entity profiles with group entity labels that indicate the group entities with which they are associated. For example, upon determining there is a set of entity profiles that matches and/or has been synthesized together, the data processing system may generate a numeric, alphabetic, or alphanumeric string as a group entity label and add the group entity label to each of the entity profiles of the set (e.g., add a group entity label to the group entity attribute-value pair of each of the entity profiles). The data processing system may generate the group entity label using a random number generator or using data that matches one or a portion of the entity profiles such as a common last name or a common phone number. The data processing system may generate the group entity labels using any method.

In some embodiments, the data processing system may generate group entity labels for the entity profiles after synthesizing entity profiles that were identified using the first set of rules and entity profiles that were identified using the second set of rules (e.g., the first and second sets of entity profiles). The data processing system may synthesize the two sets of entity profiles based on the two sets of entity profiles sharing a common entity profile (e.g., the same entity profile is in each set). The data processing system may compare the entity profiles in each set of entity profiles and identify sets with a common entity profile as being associated with the same group entity. Accordingly, when the data processing system updates the different sets of entity profiles with group entity labels, the data processing system may update entity profiles that were identified using both sets of rules with the same group entity label. In this way, the data processing system may enable the data processing system to link entity profiles that were identified by only one set of the rules and entity profiles that were only identified using the other set of rules to the same group entity (and therefore each other) and for the entity profiles to be filtered based on the group entities with which they are associated.

In some embodiments, the first or second set of entity profiles exceeding its respective threshold may cause the data processing system to discard the group entity labels for the other set of entity profiles. For example, for a group entity, the data processing system may determine a first set of entity profiles for the group entity exceeds a first threshold and the second set of entity profiles with a common entity profile with the first entity profile does not exceed a second threshold. Responsive to determining the first set of entity profiles exceeds the first threshold, the data processing system may remove the entity profile labels from both the first and the second sets of entity profiles. By doing so, the data processing system may avoid inaccurately labeling entity profiles into households when they are instead associated with a public group.

In some embodiments, upon generating a group entity label for a set of entity profiles, the data processing system may generate a group entity profile that correspond to the group entity label. The group entity profile may include group attribute-value pairs that includes information about the group such as the name of the group entity and a list of the entity profiles that have been labeled with the group entity label of the group entity. The data processing system may maintain such group entity profiles and update the group entity profiles upon each refresh of the database that stores the entity profiles to indicate any entity profiles that have been removed or added to the group entity. In some embodiments, the data processing system determines the group entity no longer satisfies a predetermined criteria (e.g., after receiving more data, the data processing system may determine there are a number of entity profiles with the group entity label that exceed a threshold and the group entity is a public group entity rather than a household group entity). In such embodiments, the data processing system may delete the group entity from memory. In this way, the data processing system may preserve memory and processing resources.

Solution Design

In an example implementation, a data processing system (e.g., household entity generator 106) may use two attribute-value pairs together to define matches between two entity profiles for a group entity label. For instance, the data processing system may use the last name and address attribute-value pairs to define a match. In some embodiments, neither last name nor address may be used alone to define a match. In some embodiments, the data processing system may not use more than two attributes at the same time, as it may generate fewer matches. A full address may include street number, street name, city, state, and zip code. The address may be an important attribute-value pair and it may have the highest number of variations compared to other attribute-value pairs.

To apply a first set of rules to entity profiles stored in a database, first, the data processing system may separate zip code from the city and state in an address attribute-value pair because the data processing system may identify the same address and zip code may come with different city names. For instance, the two strings, 449 Commerce Drive, Woodbury, MN 55125, and 449 Commerce Drive, Saint Paul, MN 55125, may both be valid address values and be directed to the same location. In some embodiments, the data processing system may only apply fuzzy comparisons to street names, where the variations may be the most likely to take place. For instance, there may be abbreviations in the street names, like 'Commerce Dr' vs 'Commerce Drive', or the street direction may appear in the front or at the end of the street name, like 'Lake Road S' vs 'S Lake Road'. A rule may have a first group entity label and be defined as follows:

'fuzzy last name + exact street number +        (Label 1)

fuzzy street name + exact zip code'.

This rule can put the above two address examples together by skipping the city and state information. The data processing system may use phonetic functions to define fuzzy last names, while for fuzzy street names, the data processing system may apply edit distance measures. The threshold value of the edit distance measures could be adjustable based on the length of the street names. A similar rule and label could be defined as follows:

'fuzzy last name + exact street number +        (Label 1.1)

fuzzy street name + exact city & state'.

The difference between Label 1.1 and Label 1 is that the data processing system may replace exact zip code with exact city & state. The rule associated with Label 1 may be useful when the same location has different city names, while Label 1.1 may be useful when the zip code value has typos or is missing. Label 1.1 and Label 1 may have many overlaps. The data processing system may unify or synthesize the entity profiles that were identified based on the rules associated with labels 1 and 1.1, thus removing all the overlaps, in a later stage.

In some embodiments, when the last name has more than one token like 'ARANDA GONZALEZ', the data processing system may consider the following two rules and labels:

'last name inclusion + exact street number +        (Label 1.2)

fuzzy street name + exact zip code', and

-continued

'last name inclusion + exact street number +        (Label 1.3)

fuzzy street name + exact city & state'.

With the name inclusion rule, by leveraging the similarity of addresses, the last name 'ARANDA GONZALEZ' could be matched with 'ARANDA' or 'GONZALEZ'. Note that in the customer profile table, the same record may have more than one address fields, like address1 and address2, each of which may contain valid address information. The rules associated with Label 1 and its variations (Label 1.1-1.3) may include address 1 and/or address 2 respectively.

In some embodiments, as discussed above, two household members may have different address values or different last names in a customer profile table. To address this issue, the data processing system may store rules that include combinations of attribute-value pairs such as last name+phone, last name+email, phone+address, email+address, and email+ phone. Such rules may be labeled with a label 2 as follows:

'fuzzy last name + exact home phone',        (Label 2)

'fuzzy last name + exact cell phone', and        (Label 2.1)

'fuzzy last name + exact home phone vs exact cell phone'.   (Label 2.2)

In some embodiments, entity profiles may have two phone fields, home phone and cell phone. The data processing system may store rules to account for three different scenarios, home phone vs home phone, cell phone vs cell phone, and home phone vs cell phone. For the rules associated with Labels 2-2.2, the data processing system may apply fuzzy comparisons on the last names, and exact matches on the phones. The remaining variations of Label 2 may be defined as follows:

'last name inclusion + exact home phone',        (Label 2.3)

'last name inclusion + exact cell phone',        (Label 2.4)

'last name inclusion +        (Label 2.5)

exact home phone vs exact cell phone', and

'last name inclusion + exact cell phone vs home phone'.   (Label 2.6)

In some embodiments, last name inclusion may be a one-way direction, Label 2.5 and 2.6 may not be exchangeable, so both are listed here. The different combinations of phones and addresses are defined in the rules with the Labels 3-3.5 as follows:

'exact home phone + exact street number +        (Label 3)

fuzzy street name + exact zip code',

'exact cell phone + exact street number +        (Label 3.1)

fuzzy street name + exact zip code',

'exact home phone vs cell phone + exact street number +   (Label 3.2)

fuzzy street name + exact zip code',

-continued

'exact home phone + exact street number +        (Label 3.3)

fuzzy street name + exact city & state',

'exact cell phone + exact street number +        (Label 3.4)

fuzzy street name + exact city & state', and

'exact home phone vs cell phone + exact street number +   (Label 3.5)

fuzzy street name + exact city & state'.

To apply the rules with the Labels 3-3.5, the data processing system may apply fuzzy comparisons on the addresses, and exact matches on the phones.

In some embodiments, the data processing system may apply rules that include different combinations of last name and email attribute-value pairs. Email may be a special attribute-value pair because a small variation could lead to two different people. For instance, the emails smith012@acme.com and smith013@acme.com could belong to two different people. Fuzzy matches on the emails could relatively easily trigger false alarms. Therefore, to apply the rules that correspond to labels 4 and 4.1, the data processing system may apply fuzzy comparisons on the last names, and exact matches on the emails:

'fuzzy last name + exact email', and        (Label 4)

'last name inclusion + exact email'.        (Label 4.1)

In some embodiments, the data processing system may apply rules that include different combinations of exact email and fuzzy address attribute-value pairs. Such rules may be associated with a Label 5 and its variations as shown below:

'exact email + exact street number +        (Label 5)

fuzzy street name + exact zip code', and

'exact email + exact street number +        (Label 5.1)

fuzzy street name + exact city & state'.

In some embodiments, the data processing system may apply rules that include different combinations of exact phone numbers and exact emails. Such rules may be associated with a label 6 and its variations as shown below:

'exact home phone + exact email',        (Label 6)

'exact cell phone + exact email', and        (Label 6.1)

'exact home phone vs cell phone+exact email'.   (Label 6.2)

Each label in the six sets may have its own contributions to define proper households, but there should be a lot of overlaps among these many labels. The data processing system may use a Graph Theory application (e.g., a Connected Component Algorithm) to integrate all the labels together to define an intermediate label. For example, Label 1 may define a group of {A, B} and Label 2 may define a group of {B, C}. The data processing system may synthesize the two groups together to obtain a group of {A, B, C}, which means A, B, and C belong to the same group entity (e.g., same household). At this stage, the data processing system may be configured to set up the maximum number of members of any intermediate label to be 7 (or any other value) because it may be unlikely that any group entity, such as a household, includes more than 7 members. Accordingly, any intermediate labels whose size is greater than 7 will become void (e.g., the data processing system may remove the intermediary labels from any group that exceeds 7 members.

Furthermore, the data processing system may also use a second set of rules that include the joint account information, which may be stored in a separate data structure or database from the entity profiles. The data processing system may have such a storage configuration because an account product could be owned by multiple customers, who may accordingly own the same account number. For example, a customer may have multiple account products with the same financial institute, so it would be one-to-many relationships between the customer ID and account number. Using the customer ID as a key, the data processing system join the account number with the attribute-value pairs of the entity profiles (e.g., identify the attribute-value pairs of entity profiles that correspond to different account numbers). The data processing system may store three different subsets of rules that includes the account numbers, such subsets may include: account number and address, account number and phone, and account number and email. In some embodiments, there might be a case in which an adult child and his/her father share the same account but live in different dwelling units and file tax returns separately. Therefore, the data processing system may not include a rule that includes the combination of account number+last name attribute-value pairs. A subset of rules that includes account number and address may be associated with the Label 7 and its variations is shown below:

'exact account number + exact street number +    (Label 7)

fuzzy street name + exact zip code', and

'exact account number + exact street number +    (Label 7.1)

fuzzy street name + exact city & state'.

A subset of rules that includes account number and phone may be associated with the Label 8 and its variations is shown below:

'exact account number + exact home phone',    (Label 8)

'exact account number + exact cell phone', and    (Label 8.1)

'exact account number+exact home phone vs cell phone'.    (Label 8.2)

The subset of rules that includes account number and address may be associated with the Label 9:

'exact account number + exact email'.    (Label 9)

The data processing system may synthesize the entity profiles that were identified as matching to integrate the three sets of labels (Lab 7-9) to generate another group of profiles with intermediate labels. The maximum number of the members of the new intermediate labels may be set to 7 or another threshold (e.g., the same or a different threshold from the first set of rules to avoid using this set of rules to identify a household that is too large.

The data processing system may finally apply the Connected Component Algorithm to unify the two sets of intermediate labels, and then generate a final household label for each entity profile. For the final labels, the data processing system may not set a limit to the number of entity profiles. Therefore, the size of the final synthesized could be greater than 7 or another threshold. However, because of how the rules for each intermediate set of entity profiles are divided, the percentage of those final labels would be small and may accurately predict households that exceed 7 or a threshold number of members.

In summary, a data processing system may split the sets of rules to identify entity profiles for individual group entities, one set that corresponds to Labels 1-6, and another set that corresponds to Labels 7-9. The data processing system may generate two groups of intermediate labels based on the two sets of rules. In each group, the data processing system may set up the maximum size of the intermediate labels that may differ or be the same between the two sets. The data processing system may then generate the final labels based on the two groups of intermediate labels without placing place an upper limit to the size of the final group. Accordingly, the data processing system may still allow for households to have more than the maximum number of members than is allowed for each intermediary grouping.

Testing Results

The proposed solution was tested with a sample file of 12 million entity profiles, which had a known household ID. Using a previous method to identify different households, among the 12 million entity profiles, 5.38 million would belong to multi-people households, the largest household having 125 entity profiles. However, using the systems and methods described herein, 6.64 million were found to belong to multi-people households, the largest household having 16 entity profiles There were 1.26 million extra entity profiles that could belong to multi-people households, which was a 23.3% increase. About 55% of the 1.26 million entity profiles came from the first set of labels (e.g., matching entity profiles identified using the first set of rules without using joint account information), while 45% came from the second set of labels (e.g., matching entity profiles identified using the second set of rules that take into account joint account information), showing that incorporating the joint account information had a significant impact on the performance of the proposed algorithm. 99.4% of the 6.64 million entity profiles would belong to households with no more than 7 people. Only a small portion (0.6%) would belong to households with more than 7 people. The table below shows the distributions of the household sizes of the two solutions:

| Size of Household | Prior Solution | Proposed Solution | Number Increase |
|---|---|---|---|
| 2 | 2,049,550 | 2,373,140 | 323,590 |
| 3 | 250,120 | 337,984 | 87,864 |
| 4 | 91,348 | 137,051 | 45,703 |
| 5 | 23,655 | 42,852 | 19,197 |
| 6 | 5,467 | 13,038 | 7,571 |
| 7 | 1,367 | 4,590 | 3,223 |

Among the 5.38 million entity profiles classified by the previous solution, there were 118 thousand entity profiles that could not be found in the 6.64 million entity profiles classified by the proposed algorithm. This means that 98% of the results of the previous solution were included in the new results. The following method was used to verify the results:

Step 1. Select a random set of 20 households from the 118 thousand entity profiles that were only available in the previous solution and select a random set of 20 households from the 1.26 million entity profiles that were only available in the new solution.

Step 2. Manually check the false alarms of the two random sets.

Step 3. Repeat Steps 1 and 2 a number of times.

In the data, the false alarm rate in the first random set was high, while the false alarm rate in the second random set was low. The repeated 'cross validations' showed that the proposed solution could significantly increase the household detection rate while keeping a low false alarm rate.

System for Using Hierarchical Data Structures for Entity Matching

Financial institutions store and process a vast amount of data for users on the institutions' servers. In doing so, the servers are often forced to store the data for the users in memory such that the data can be retrieved when users wish to view their data and/or when the financial institutions wish to aggregate and/or evaluate the data to improve their internal processes. The amount of data the servers store increases on a daily basis as users interact with their respective financial institutions, such as when the users participate in transactions and/or create or access their accounts. Each interaction may cause a record containing data for the interaction to be stored in memory of the servers. Because more and more individuals are creating accounts through financial institutions, the servers that the financial institutions use to store such data are often required to have increasing amounts of memory to account for the almost exponential increases in data that the servers are required to store.

As a consequence of storing large amounts of data, any big data retrievals that servers are requested to perform require a large amount of computing resources to search through memory for the requested data. This problem becomes more apparent when data is requested about individuals that are not linked to each other in any way. For example, a client device may request data about households in a particular urban area from a server. The server may receive the request and search all of memory for accounts with zip codes in the urban area. Such retrieval may take minutes to hours depending on the number of individuals that have accounts. The retrieval may take such a large amount of time because the servers are required to query address attribute-value pairs of every account in memory. Further, the server may not have any indication as to which accounts are associated with the same households in the area or even which accounts are associated with the same individual, so the server may not be able to separate the data by household or individual to fulfill the request. Previous attempts to group accounts by individual or household to aid in such searching include determining accounts that are associated with the same name are associated with the same individual and accounts that are associated with the same address may be a part of the same household. However, as described above, these rules may have technical limitations in that accounts may be improperly labeled as being associated with a household or owned by a particular individual as a result of typographical errors. In some cases, implementing such rules may result in overmatching accounts into improper households or as being associated with the wrong individuals. Further, a server may be limited in the types of requests that the server can handle as the server may receive requests for data that are associated with other types of groups (e.g., groups of profiles that share an account or groups of profiles that are otherwise related) for which the server does not have the information readily available. While the server may search through all of memory to identify accounts that have the requested data, such searching can require a large amount of processing resources and memory.

Implementations of the systems and methods discussed herein overcome these technical deficiencies because they provide a method for storing data for accounts using a series of hierarchical data structures. For example, a computing device of a financial institution may store accounts for a large number of individuals. The computing device may implement a set of rules to group the accounts by the individuals that own the accounts. The computing device may generate a profile for each of the individuals and link the accounts to the profiles that are associated with the same individuals. The computing device may then implement another set of rules on the data in the profiles to determine how to group the profiles together. The computing device may group the profiles based on the profiles having matching attribute-value pairs according to one or more rules, sharing a link to a common account, and/or having specific matching attribute-value pairs. The computing device may link the profiles by generating a group profile for each group of profiles and linking the groups of profiles to the respective group profiles. In this way, the computing device may generate hierarchical data structures that can be easily searched using the links between the accounts and profiles of the hierarchical data structure. Upon receipt of a request, the computing device can identify the hierarchical data structures that contain data for the request and limit searching to the hierarchical data structure, thus limiting the processing resources that are required to retrieve data in response to a request to only search the accounts and profiles of the hierarchical data structure instead of all of memory.

One advantage to implementing the systems and methods described herein is that a computer implementing such systems and methods may insert profiles for individuals into multiple hierarchical data structures. For example, the computer may insert a profile into a household hierarchical data structure based on a set of rules that is specific to identifying profiles of the same household, a shared hierarchical data structure based on a set of rules that are specific to identifying profiles that share a common account, and a relation hierarchical data structure based on a set of rules that are specific to identifying profiles that have a particular attribute-value pair in common (e.g., a customer number attribute-value pair). The computer may insert the profile into each of these hierarchical data structures by inserting identifiers of each hierarchical data structure (e.g., an identifier of the top profile of the respective hierarchical data structures) into one or more attribute-value pairs of the profile and/or accounts linked to the profile. Each hierarchical data structure may include profiles for different groups of individuals. Accordingly, if the computer receives a request about a particular set of individuals including the individual associated with the profile, the computer may identify the hierarchical data structure associated with the request (e.g., identify the hierarchical data structure based on an identifier of the hierarchical data structure in the request) and retrieve data from the profiles and accounts that are linked to each other within the hierarchical data structure. The computer may later receive another request for data from the profile within the context of another group of profiles. The computer may identify and retrieve data from the hierarchical data structure associated with the other group of profiles. Accordingly, by implementing the systems and methods described herein, the computer may enable fast and efficient data retrieval from groups of profiles and/or accounts while minimizing the number of accounts and profiles the data processing system searches.

Figure 6:
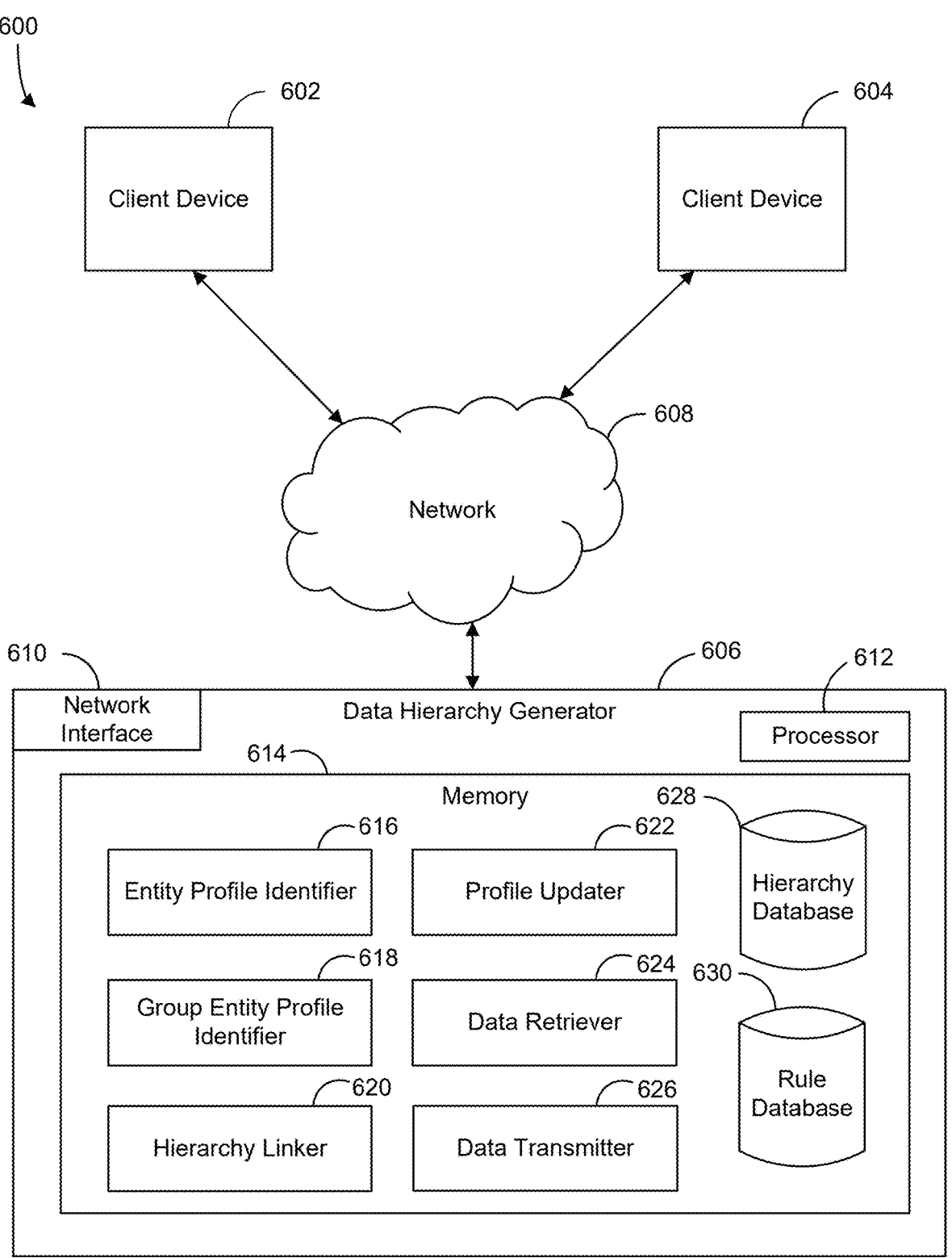
FIG. 6 is an illustration of a system for using hierarchical data structures for entity matching, in accordance with an implementation.

FIG. 6 is an illustration of a system 600 for using hierarchical data structures for entity matching, in accordance with an implementation. In brief overview, system 600 can include two client devices 602 and 604 that communicate with a data hierarchy generator 606 over a network 608. These components may operate together to generate hierarchical data structures for different entities (e.g., household entities, individual entities, etc.) and matching the hierarchical data structures together for faster data retrieval. System 600 may include more, fewer, or different components than shown in FIG. 6. For example, there may be any number of client devices, computers that make up or are a part of data hierarchy generator 606 or networks in system 600. The components may be the same as or similar to the corresponding components of system 100, shown and described with reference to FIG. 1.

Client devices 602 and 604 and/or data hierarchy generator 606 can include or execute on one or more processors or computing devices and/or communicate via network 608. Network 608 can include computer networks such as the Internet, local, wide, metro, or other area networks, intranets, satellite networks, and other communication networks such as voice or data mobile telephone networks. Network 608 can be used to access information resources such as web pages, websites, domain names, or uniform resource locators that can be presented, output, rendered, or displayed on at least one computing device (e.g., client device 602 or 604), such as a laptop, desktop, tablet, personal digital assistant, smartphone, portable computers, or speaker. For example, via network 608, client devices 602 and 604 can access entity profiles that are stored in data hierarchy generator 606.

Each of client devices 602 and 604 and/or data hierarchy generator 606 can include or utilize at least one processing unit or other logic devices such as a programmable logic array engine or a module configured to communicate with one another or other resources or databases. The components of client devices 602 and 604 and/or data hierarchy generator 606 can be separate components or a single component. System 600 and its components can include hardware elements, such as one or more processors, logic devices, or circuits.

Data hierarchy generator 606 may comprise one or more processors that are configured to generate hierarchical data structures that contain data for different groups of profiles and/or accounts. Data hierarchy generator 606 may comprise a network interface 610, a processor 612, and/or memory 614. Data hierarchy generator 606 may communicate with client devices 602 and 604 via network interface 610. Processor 612 may be or include an ASIC, one or more FPGAs, a DSP, circuits containing one or more processing components, circuitry for supporting a microprocessor, a group of processing components, or other suitable electronic processing components. In some embodiments, processor 612 may execute computer code or modules (e.g., executable code, object code, source code, script code, machine code, etc.) stored in memory 614 to facilitate the activities described herein. Memory 614 may be any volatile or non-volatile computer-readable storage medium capable of storing data or computer code.

Memory 614 may include an entity profile identifier 616, a group entity profile identifier 618, a hierarchy linker 620, a profile updater 622, a data retriever 624, a data transmitter 626, a hierarchy database 628, and/or a rule database 630, in some embodiments. In brief overview, components 616-626 may cooperate to generate and store hierarchical data structures in hierarchy database 628. Each hierarchical data structure may store data for a series of linked profiles. Components 616-626 may generate the hierarchical data structures by applying a first set of rules from rule database 630 to identify accounts that are owned by the same individual (e.g., accounts that need to be linked to the same profile for such an individual), applying a second set of rules to identify profiles for individuals that are a part of the same household, and linking the accounts, the profiles for the individuals, and the profiles for the household together to generate a hierarchical data structure such that data can be retrieved more easily upon receipt of a request for data and any account or profile of the hierarchical data structure.

Hierarchy database 628 may include one or more databases (e.g., databases in a distributed system). Hierarchy database 628 may store accounts and/or profiles for different individual entities (e.g., individual people) and/or group entities (e.g., companies, households, organizations, sets of individual entities that share an account, sets of individual entities that share a customer number or other attribute, etc.). Individual entity profiles may be referred to herein as entity profiles and the group entity profiles as group entity profiles or their specific type of group entity (e.g., household entity profile, shared profile, relation profile, etc.). The individual entity profiles may be stored as data structures with one or more attribute-value pairs such as, for example, accounts may include attribute-value pairs for first name, last name, full name, address, phone number, cell phone number, home phone number, tax identification number, street name, zip code, city, state, account number, household identification number, group entity number, company identification number, etc. The individual entity profiles may also include attribute-value pairs for different types of group entities to which the individual entity profiles may be linked (e.g., household entity profiles, shared profiles, relation profiles, etc.). The group entity profiles may similarly be stored as data structures with attribute-value pairs (e.g., name, address, phone number, number of employees, names of the employees, number of people in a household, type of business, or any other data about the individuals that have individual entity profiles linked to the respective group entity profiles). The different profiles that are stored in hierarchy database 628 may be updated over time as data hierarchy generator 606 receives or determines new values (e.g., copies values from new records) for the profiles.

Data hierarchy generator 606 may store accounts, individual entity profiles, and group entity profiles in hierarchy database 628. Hierarchy database 628 may be a relational database. The stored accounts may be or include different types of accounts, such as bank accounts, credit card accounts, user profiles with different websites, etc. The accounts may include attribute-value pairs (e.g., account attribute-value pairs) that each include a different attribute and a value for the attribute. For example, the accounts may include attribute-value pairs for first name, last name, full name, address, phone number, cell phone number, home phone number, tax identification number, street name, zip code, city, state, account number, household identification number, group entity number, company identification number, etc. The accounts may also include attribute-value pairs for different types of group entities to which the individual entity profiles may be linked (e.g., household entity profiles, shared profiles, relation profiles, etc.). Data hierarchy generator 606 may initially store the accounts with attribute-value pairs with blank values in the data structures for the respective entity profiles. Data hierarchy generator 606 may then add values to the attribute-value pairs as data hierarchy generator 606 receives inputs (e.g., user inputs) or records for the account.

Individual entity profiles may store aggregated data from accounts that are owned or otherwise associated with the same individual and/or other data about the individual. Data hierarchy generator 606 may generate individual entity profiles upon grouping sets of accounts together as being associated with the same individual. In some cases, upon structure. The identifiers may be alphanumeric or numeric identifiers of the profiles or accounts and may operate as pointers to the lower accounts or profiles. The identifiers may be stored in attribute-value pairs of the respective profiles. Accordingly, when searching hierarchy database 628 for an account or profile with a matching identifier to an identification in a request, data hierarchy generator 606 may identify one account or profile in the hierarchy and quickly identify the other accounts and profiles in the same data structure using the pointers in the different accounts and profiles of the hierarchical data structure to retrieve data from each account and/or profile in the hierarchical data structure.

In some embodiments, the data structures of hierarchy database 628 may store multiple records for individual data structures of the accounts, individual entity profiles, and/or individual group entity profiles. An example of an individual entity profile data structure that includes multiple records is below:

| Customer ID | Name | Birth Date | Tax Identification No. | Phone | Address | Email | Update date |
|---|---|---|---|---|---|---|---|
| 00226 | Amy S. Johnson | 1992 May 16 | 222242222 | | 156 First Ave S, Minneapolis | AMY@ACME.com | 2018 Sep. 9 |
| 00226 | Amy S. Johnson | 1992 Jun. 16 | 222242222 | 6127771244 | 156 First Ave S, Minneapolis | AMY@ACME.com | 2018 Sep. 9 | grouping the accounts into a set of accounts, data hierarchy generator 606 may retrieve data from the accounts, in some cases responsive to the data being common across multiple accounts, and add the retrieved data to a generated individual entity profile. In some embodiments, data hierarchy generator 606 may update the individual entity profile with new data as the data is added to accounts and/or more accounts are linked to the individual entity profile.

In some embodiments, individual entity profiles and accounts may be linked to one or more group entity profiles that are also stored in hierarchy database 628, such as a household profile, a shared profile, or a relation profile. Group entity profiles may include attribute-value pairs similar to individual entity profiles. Group entity profiles may be generated and/or updated with data from the individual entity profiles that are linked to them similar to how the individual entity profiles are generated and/or updated with data from accounts. Individual entity profiles and/or accounts may be linked to such group profiles by identifiers of the group entity profiles that are stored in the respective individual entity accounts and/or accounts. For example, an individual entity profile may be linked to a household entity profile. Accordingly, the individual entity profile and/or the accounts linked to the individual entity profile may each store an identifier of the household entity profile in an attribute-value pair that is dedicated to storing identifiers for household entity profiles or an attribute-value pair that is dedicated to storing identifiers for any and/or all of such identifiers. The individual entity profiles may store multiple identifiers for group entities. Thus, hierarchy database 628 may store a complex web of hierarchical data structures that can be easily queried using the identifiers of the different hierarchies in the profiles and accounts.

In some embodiments, the profiles of a hierarchical data structure may additionally include identifiers of the accounts or profiles that are on lower levels of the hierarchical data Account data structures may include the same or similar data. As illustrated, records in a data structure may have varying amounts of data between each other and, in some cases, the data may conflict with each other. Data hierarchy generator 606 may determine matches for accounts and/or profiles based on each of the records in a particular data structure.

Entity profile identifier 616 may comprise programmable instructions that, upon execution, cause processor 612 to identify individual entity profiles from accounts stored in hierarchy database 628. Entity profile identifier 616 may do so by applying a first set of rules that are stored in rule database 630 (e.g., a relational database that stores rules that can be used to match accounts into sets and profiles into sets) to the accounts stored in hierarchy database 628. The first set of rules may be a series of rules that indicate when accounts are or likely are associated with the same individual entity. Individual rules of the first set of rules may include fuzzy matching and/or exact matching rules for different account attribute-value pairs that indicate when to match accounts together. For example, one rule may be that two accounts are associated with the same individual entity if the accounts have an exact tax identification number match, a non-exact date of birth match (e.g., a fuzzy match, which may be determined using different functions, such as an edit distance function), and a non-exact phone number match. Another rule may be that two accounts are associated with the same individual entity if the accounts have an exact name match, a non-exact tax identification number match, and a non-exact date of birth match. Entity profile identifier 616 may apply similar rules of any type to the attribute-value pairs of the accounts.

Entity profile identifier 616 may determine if any of the accounts satisfy a rule of the first set of rules. Entity profile identifier 616 may do so, for example, by identifying and comparing attribute-value pairs for the individual accounts stored in memory for the individual rules of the first set of rules. For example, if a rule includes matching rules for name and date of birth, entity profile identifier 616 may identify values of the name and date of birth account attribute-value pairs and compare the values to determine if the pairs satisfy the matching rules. Entity profile identifier 616 may perform similar operations for each rule of the first set of rules. If entity profile identifier 616 does identify accounts that match with each other, entity profile identifier 616 may identify accounts that match with each other as corresponding to the same individual entities. More detail about the different types of rules of the first set of rules and how entity profile identifier 616 applies such rules to identify accounts that are matched with each other is included in U.S. Pat. No. 10,983,983, entitled "Entity Resolution based on Multiple Attributes," and filed Mar. 8, 2018, the entirety of which is incorporated by reference herein.

In some cases, upon applying the first set of rules to the accounts stored in memory, entity profile identifier 616 identifies a first set of accounts and a second set of accounts. The first set of accounts may be accounts that entity profile identifier 616 matched with each other using the first set of rules and that correspond to a first individual entity, and the second set of accounts may be accounts that entity profile identifier 616 matched with each other using the first set of rules and that correspond to a second individual entity. In some embodiments, entity profile identifier 616 may identify the sets of accounts by synthesizing the accounts that are matched with each other. For example, account A may be matched with account B, but not account C. Account C may be matched with account B. Account B may operate as a linking account and cause entity profile identifier 616 to determine to group each of accounts A-C into the same set of accounts (e.g., label each account of the set of accounts with a label indicating the account's group). Entity profile identifier 616 may employ these synthesizing techniques to identify the first and second sets of accounts.

Entity profile identifier 616 links the first set of accounts and the second set of accounts to individual entity profiles. Entity profile identifier 616 may link the first set of accounts to a first individual entity profile by inserting an identifier for the first individual entity profile (e.g., a first entity identifier) into an entity account attribute-value pair (e.g., an attribute-value pair with a value dedicated to the individual entity to which the respective account is associated) of each account of the first set of accounts. The identifier may be an alphanumeric or numeric string that individually identifies the first individual entity profile. The identifier may be a pointer that includes the address of the individual entity profile within the memory of entity profile identifier 616. Accordingly, when entity profile identifier 616 receives a request identifying an account that includes the identifier or an identification of the individual entity profile itself, entity profile identifier 616 may retrieve data from the respective account and/or individual entity profile. In some embodiments, entity profile identifier 616 may store similar identifiers for the accounts that are linked to the individual entity profile. Such identifiers may point to the accounts so data hierarchy generator 606 may retrieve data from each account linked to the individual entity profile upon identifying one account linked to the individual entity profile. Entity profile identifier 616 may similarly insert an identifier into a second individual entity profile for the second set of accounts such that data hierarchy generator 606 may quickly retrieve data for each individual entity profile and account upon receiving a request for such data.

In some embodiments, instead of inserting an identifier for the individual entity profile in the accounts themselves, entity profile identifier 616 may maintain and update a separate linkage database (e.g., a relational database) (not shown) that includes data indicating the links between the accounts and individual entity profiles. For example, upon identifying the first set of accounts, entity profile identifier 616 may store an indication in the linkage database that indicates the first set of accounts are linked to the profile for the first individual entity. The indication may operate as a pointer to data for the respective account and the profile. Entity profile identifier 616 may similarly store an indication in the linkage database that indicates the second set of accounts are linked to the profile for the second individual entity upon identifying the second set of accounts. Accordingly, in these embodiments, when entity profile identifier 616 receives a request identifying an account of the first set of accounts or the second set of accounts that includes an identifier or an identification of the respective individual entity profile, entity profile identifier 616 may identify the relationship between the account and the individual entity profile from the linkage database and retrieve data from the individual entity profile and account using the relationship indication to identify the data.

In some embodiments, accounts may be linked to multiple individual entity profiles. This may be the case, for example, when multiple individuals own and are named on a particular account. When this occurs, the account may include data for each of the individuals and the data for the individuals may be processed as separate accounts. For example, individual A and individual B may own account C. Entity profile identifier 616 may store data separately for individuals A and B in the data structure that stores data for account C. Accordingly, when entity profile identifier 616 applies the first set of rules to account C, entity profile identifier 616 may identify matches for individual A and other accounts and matches for individual B and other accounts. This may result in entity profile identifier 616 grouping data for individual B with a different set of accounts than the data for individual A, and thus cause entity profile identifier 616 to link account C with multiple individual entity profiles.

Group entity profile identifier 618 may comprise programmable instructions that, upon execution, cause processor 612 to identify group entity profiles to link to the individual entity profiles that entity profile identifier 616 identified. Group entity profile identifier 618 may determine whether the two individual entity profiles satisfy a second set of rules. The second set of rules may be matching rules between individual entity profiles that indicate whether the profiles represent entities that are members of the same household. The second set of rules may include the first and second sets of rules described with reference to FIG. 5 as subsets of the second set of rules. For example, the second set of rules may include matching rules that identify attributes-value pairs of individual entity profiles. If individual rules of the second set of rules are satisfied by values for individual entity profiles, group entity profile identifier 618 may determine the different entities of the individual entity profiles are a part of or otherwise associated with the same household. Group entity profile identifier 618 may determine if the two individual entity profiles, and any other individual entity profiles that group entity profile identifier 618 has stored in memory, are members of the same household using the method described in operations 506-528 of method 500, shown and described with reference to FIG. 5.

Responsive to one or both of the two individual entity profiles, or any other individual entity profile, not satisfying any rules of the second set of rules (and therefore not being associated with a particular household or another group entity associated with the second set of rules), group entity profile identifier 618 may insert null values into a household attribute-value pair of the respective individual entity profile. The null value may be a zero or any other unique identifier that indicates the individual entity profile is not associated with a household entity profile. In some embodiments, by inserting the null value into an individual entity profile, group entity profile identifier 618 may indicate that the individual entity profile is the top profile of a hierarchical data structure and is not linked to any other individual entity profile or household entity profile in any manner. Such may be the case, for example, when an individual lives alone or does not have any roommates.

In some embodiments, group entity profile identifier 618 may delete or discard household entity profiles that are linked to too many individual entity profiles. For example, when generating a hierarchical data structure that includes multiple individual entity profiles linked to a common household entity profile, group entity profile identifier 618 may maintain a counter and increment the counter for each individual entity profile and/or account that would be linked to the household entity profile. Group entity profile identifier 618 may compare the final count of the counter to a threshold (e.g., a predetermined threshold). If group entity profile identifier 618 determines the count exceeds the threshold, group entity profile identifier 618 may not generate the household entity profile and insert null values into each of the household profile attribute-value pairs of the individual entity profiles that were initially determined to be linked to the household entity profile. In some cases, group entity profile identifier 618 may determine the number of individual entity profiles that would be linked to a household entity profile exceeds the threshold responsive to an update to a previously existing hierarchical data structure. In these cases, group entity profile identifier 618 may delete or discard the household entity profile and replace the identifiers of the household entity profile in the individual entity profiles with null values. In this way, group entity profile identifier 618 may limit the number of profiles and/or accounts that can be a part of a hierarchical data structure and thus limit the processing resources that are required to retrieve data from such a hierarchical data structure. Group entity profile identifier 618 may similarly limit the size of any type of hierarchical data structure (e.g., hierarchical data structures that were generated according to any sets of rules).

However, responsive to the two individual entity profiles satisfying a rule of the second set of rules (e.g., responsive to group entity profile identifier 618 determining the two individual entity profiles are associated with the same household according to the second set of rules), group entity profile identifier 618 links the two individual entity profiles together. Group entity profile identifier 618 may do so by inserting a common identifier for a household entity profile in a household attribute-value pair of each of the profiles. The identifier may be similar to the individual entity identifier that group entity profile identifier 618 inserts into accounts to indicate the accounts are linked to individual entity profiles. In some embodiments, group entity profile identifier 618 may additionally or instead insert an identifier of the household profile into the accounts that are linked to the respective individual entity profiles. In this way, group entity profile identifier 618 may indicate the household profiles with which the accounts are linked.

Identifiers for the household profiles may be pointers to the household profiles such that data hierarchy generator may quickly retrieve and/or aggregate data about the individual accounts and/or individual entity profiles that are linked to the household profiles upon receipt of a request comprising an identification of the household profile. For example, data hierarchy generator 606 may compare the identification in the request to the identifiers in the accounts and/or profiles and identify accounts and/or profiles with matching identifiers and the data in the corresponding accounts and/or profile. In cases in which the individual entity profiles include identifiers of the accounts to which they are linked and the household profile includes identifiers of the individual entity profiles that are linked to the household profile, data hierarchy generator 606 may be able to identify the hierarchical data structure by identifying one account that includes the matching identifier and then identify and retrieve data from each account and profile in the hierarchical data structure using the identifiers to traverse the hierarchical data structure.

In some embodiments, when determining whether accounts and/or individual entity profiles satisfy the first and/or second set of rules, group entity profile identifier 618 applies the respective rules to historical data of each account and/or individual entity profile. For example, group entity profile identifier 618 may receive records that contain data for individual accounts and/or individual entity profiles over time. In one example, one record for an account may contain an individual's name, birth date, customer identification number, address, and phone number, while another record may contain the same individual's name, birth date, and customer identification number, but may contain a different address. Group entity profile identifier 618 may store each record in the data structure for the account. Accordingly, when applying the first set of rules to the account, group entity profile identifier 618 may evaluate the data from each record to data of other accounts to determine if there are any matching accounts. Group entity profile identifier 618 may similarly store and evaluate records for any number of individual entity profiles and/or accounts. In this way, group entity profile identifier 618 may identify matching accounts that are likely owned by the same individual, even if the most recent data does not exactly match with another account or if there is a typographical error in one of the records.

Group entity profile identifier 618 may store such records for a predefined duration. For example, upon storing a record, group entity profile identifier 618 may assign a time stamp to the record that is the predefined duration from the time group entity profile identifier 618 stores the record. Group entity profile identifier 618 may store an internal calendar and/or clock. Group entity profile identifier 618 may determine when the current value of the calendar and/or clock is equal to the time stamp. Upon making this determination, group entity profile identifier 618 may remove the old record from memory. In this way, group entity profile identifier 618 may both conserve memory and avoid using stale data that could cause improper matching.

In some embodiments, group entity profile identifier 618 updates the records stored in memory in real-time according to a set of update rules. The update rules may be rules that indicate how to handle records that are stored for an account upon receiving a new record with data for the same account. In one example, an update rule may be that if a new record for an account contains differing information for the account (e.g., a change in address or phone number) than the currently stored records for the account, group entity profile identifier 618 will store the record in the data structure with the other previously stored records, thus enabling group entity profile identifier 618 to match the account with other accounts based on the old data. In another example, an update rule may be that if a new record contains the same but more information than a currently stored record, group entity profile identifier 618 will remove the currently stored records for the account to conserve memory resources without removing any potential matches. In another example, an update rule may be that if a new record contains the same or less information as other records for the account, group entity profile identifier 618 may discard the new record to avoid storing repetitive information and using unnecessary resources.

In some embodiments, individual entity profiles may be stored in multiple hierarchical data structures in memory in group entity profile identifier 618. For example, group entity profile identifier 618 may generate and store hierarchical data structures that include individual entity profiles that are linked to a common account. In this example, group entity profile identifier 618 may identify two individual entity profiles that are linked to the same account, generate a shared profile, and link the two individual entity profiles to each other by linking the individual entity profiles to the shared profile. In another example, group entity profile identifier 618 may generate hierarchical data structures based on individual entity profiles having specific matching attribute-value pairs with each other. For instance, group entity profile identifier 618 may link two individual entity profiles to each other that have a matching customer number. Group entity profile identifier 618 may do so by linking the two individual entity profiles to a relation profile. In some cases, group entity profile identifier 618 may determine to link the hierarchical data structures in the examples above by linking the relation profile and the shared profile together through a shared profile. Group entity profile identifier 618 may do so responsive to determining the relation profile and the shared profile satisfy a matching rule (e.g., a common attribute-value pair or any other matching rule). Group entity profile identifier 618 may generate hierarchical data structures based on any rule.

Group entity profile identifier 618 may link the individual entity profiles to the shared profile and/or the relation profile by storing an identifier for the shared profile and/or relation profile in a shared and/or relation attribute-value pair or another attribute-value pair in the respective individual entity profiles and/or accounts linked to the individual entity profiles. Group entity profile identifier 618 may store any number of such identifiers in accounts and/or profiles, enabling individual accounts and/or individual entity profiles to be a part of multiple hierarchical data structures. Group entity profile identifier 618 may thus generate different types of hierarchical data structures that each store different combinations of data. In this way, group entity profile identifier 618 may quickly retrieve specific data in response to a request by identifying the hierarchical data structure that includes a combination of individual entity profiles and/or accounts that includes data to include in a response to the request (e.g., group entity profile identifier 618 can quickly retrieve data for a household by identifying a household hierarchical data structure and retrieving the data from the accounts of the household).

Entity profile identifier 616 and group entity profile identifier 618 may generate a hierarchical data structure for a second household entity profile. Entity profile identifier 616 and group entity profile identifier 618 may generate the hierarchical data structure for the second household entity profile in a similar manner to how entity profile identifier 616 and group entity profile identifier 618 generated the hierarchical data structure for the first household entity profile. For instance, entity profile identifier 616 may identify third and fourth sets of accounts when entity profile identifier 616 applies the first set of rules to the accounts in memory. Entity profile identifier 616 may link the third and fourth sets of accounts to respective individual entity profiles. Group entity profile identifier 618 may determine the third and fourth individual entity profiles are associated with individual entities of the same household or other group entity. Group entity profile identifier 618 may then link the third and fourth individual entity profiles and/or the accounts linked to the third and fourth individual entity profiles to a second household entity profile representing the household. In this way, entity profile identifier 616 and group entity profile identifier 618 may generate a hierarchical data structure that includes data for each account that is owned by members of the same household such that data for the household and members of the household may be quickly retrieved upon receipt of a request.

Hierarchy linker 620 may comprise programmable instructions that, upon execution, cause processor 612 to link hierarchical data structures together. Hierarchy linker 620 determines if the first hierarchical data structure for the first household entity profile and the second hierarchical data structure for the second household entity profile includes a common attribute-value pair. Hierarchy linker 620 may do so by comparing the values of the corresponding attribute-value pairs between the first and second household profiles. In some embodiments, hierarchy linker 620 may only compare a subset of the attribute-value pairs of the household entity profiles with each other. For example, hierarchy linker 620 may only compare attribute-value pairs for email, phone, and account number of the two household entity profiles and not other attribute-value pairs such as last name and address, thus minimizing false positives in matching households.

If hierarchy linker 620 identifies at least one matching attribute-value pair based on the comparison, hierarchy linker 620 may link the matching household entity profiles together. Hierarchy linker 620 may do so by generating a community entity profile and linking the matching household entities to the community entity profile. Hierarchy linker 620 may generate the community entity profile using data from the individual entity profiles that are linked to the community entity profile similar to how the individual entity profiles and the household entity profiles were generated using data from the respective preceding layer in the hierarchical data structure. Hierarchy linker 620 may link the household entities to the community entity profile by inserting an identifier of the community entity profile in community attribute-value pairs of the household entity profiles, the individual entity profiles, and/or the accounts (and, in some cases identifiers of the profiles and/or accounts in the community entity profile); and/or the linkage database such that hierarchy linker 620 may quickly retrieve data from accounts and/or profiles that are linked to the community entity upon receiving a request for such data, as described above.

In some cases, multiple household entity profiles may be linked to the same community entity profile. For example, household entity profiles A and B may share the same account number, household entity profiles B and C may share the same phone number, and household entity profiles C and D may share the same email address. Hierarchy linker 620 may identify the matching attribute-value pairs and link each of the household entity profiles to the same community entity profile responsive to identifying the matches.

In some embodiments, hierarchy linker 620 may link the household entity profile of a first hierarchical data structure to an individual entity profile (e.g., a third entity profile) of a second hierarchical data structure. For example, when generating a second hierarchical data structure, hierarchy linker 620 may generate an individual entity profile that links a series of accounts together. Hierarchy linker 620 may not, however, identify any individual entity profiles that match the individual entity profile according to the second set of rules. Hierarchy linker 620 may insert a null value into the household attribute-value pair of the individual entity profile accordingly. When hierarchy linker 620 queries hierarchical data structures in memory to link with the first hierarchical data structure, hierarchy linker 620 may identify the null value in the household attribute-value pair, determine the individual entity profile is at the top of the second hierarchical data structure based on the null value, and compare the attribute-value pairs of the household profile of the first hierarchical data structure to the individual entity profile similar to the above responsive to identifying the null value. If hierarchy linker 620 identifies a matching attribute-value pair based on the comparison, hierarchy linker 620 may link the individual entity profile with the household entity profile together (e.g., link the two profiles to a common community entity profile).

Profile updater 622 may comprise programmable instructions that, upon execution, cause processor 612 to update profiles in response to an update to the data in hierarchy database 628. Profile updater 622 may detect a change in a value of an account. The change in value may be a user input change that profile updater 622 determines based on a new set of data. For example, profile updater 622 may detect a change in address, name, tax identification number, phone number, email address, postal address, or any other value of an attribute-value pair of an account of the first hierarchical data structure. Profile updater 622 may detect the change, for example, by placing interrupts at each attribute-value pair of the accounts of the first hierarchical data structure and detecting the change when an interrupt is triggered. In another example, profile updater 622 may detect the change upon receiving a new record for an account, comparing the data from the record to corresponding data in the account (e.g., comparing the name in the record to the name in the account), and determining if the values match. Profile updater 622 may detect a change when a value does not match based on such a comparison.

Profile updater 622 may identify a subset of accounts of the plurality of accounts responsive to detecting the change in value. Profile updater 622 may identify the subset of accounts by identifying the accounts that have matching attribute-value pairs to the account with the changed value. In some embodiments, profile updater 622 may only identify accounts that have matching attribute-value pairs of a predefined type or types (e.g., address, name, email, tax identification number, etc.). In some embodiments, profile updater 622 may only identify accounts that have a predefined number of matching attribute-value pairs for the subset of accounts. In this way, profile updater 622 may filter or reduce the number of accounts to apply rules to when generating or updating a hierarchical data structure for the updated accounts and avoid processing data for every stored account, which could take upwards of eight hours for a single update and cause the system to be unmanageable.

Entity profile identifier 616 and group entity profile identifier 618 may re-apply rules to the accounts to generate a hierarchical data structure for the updated account. For instance, entity profile identifier 616 may re-apply the first set of rules to the subset of accounts to identify sets of accounts that satisfy the rules. Entity profile identifier 616 may identify or generate individual entity profiles for the sets of accounts and link the individual entity profiles to their corresponding sets of accounts. Group entity profile identifier 618 may then apply the second set of rules to the individual entity profiles to generate and/or identify household entity profiles to link to the individual entity profiles. Hierarchy linker 620 may then compare the attribute-value pairs of the household entity profiles to identify community entity profiles for the household entity profiles. Entity profile identifier 616, group entity profile identifier 618, and/or hierarchy linker 620 may similarly create new hierarchical data structures when a new account is added to memory. In this way, data hierarchy generator 606 may maintain real-time hierarchy data structures for accounts as data for the accounts are updated and/or new accounts are added to the memory of data hierarchy generator 606.

Data retriever 624 may comprise programmable instructions that, upon execution, cause processor 612 to retrieve data from the hierarchical data structures in hierarchy database 628 in response to data hierarchy generator 606 receiving a request for data. Data retriever 624 may receive a request from a client device. The request may be a request for data regarding the household entity represented by the household entity profile of the first hierarchical data structure. The request may include an identification of the household entity. Data retriever 624 may identify the identification of the household entity from the request. Data retriever 624 may compare the identification to the accounts and/or profiles of the hierarchical data structures stored in memory. Upon identifying a hierarchical data structure with an account or profile that has a matching identifier to the identification, data retriever 624 may identify the accounts of the hierarchical data structure using the pointers that point to the different accounts and profiles and retrieve data about the respective accounts and profiles of the hierarchical data structure. Upon identifying the account that has a matching household identifier to the identification in the request, data retriever 624 may stop searching memory and data transmitter 626 (e.g., an application programming interface (API)) may transmit the retrieved data to the requesting client device. Thus, data retriever 624 may identify the requested data from the hierarchical data structure and avoid searching the entire database for data of accounts and profiles at each instance data hierarchy generator 606 receives a request.

Figure 7:
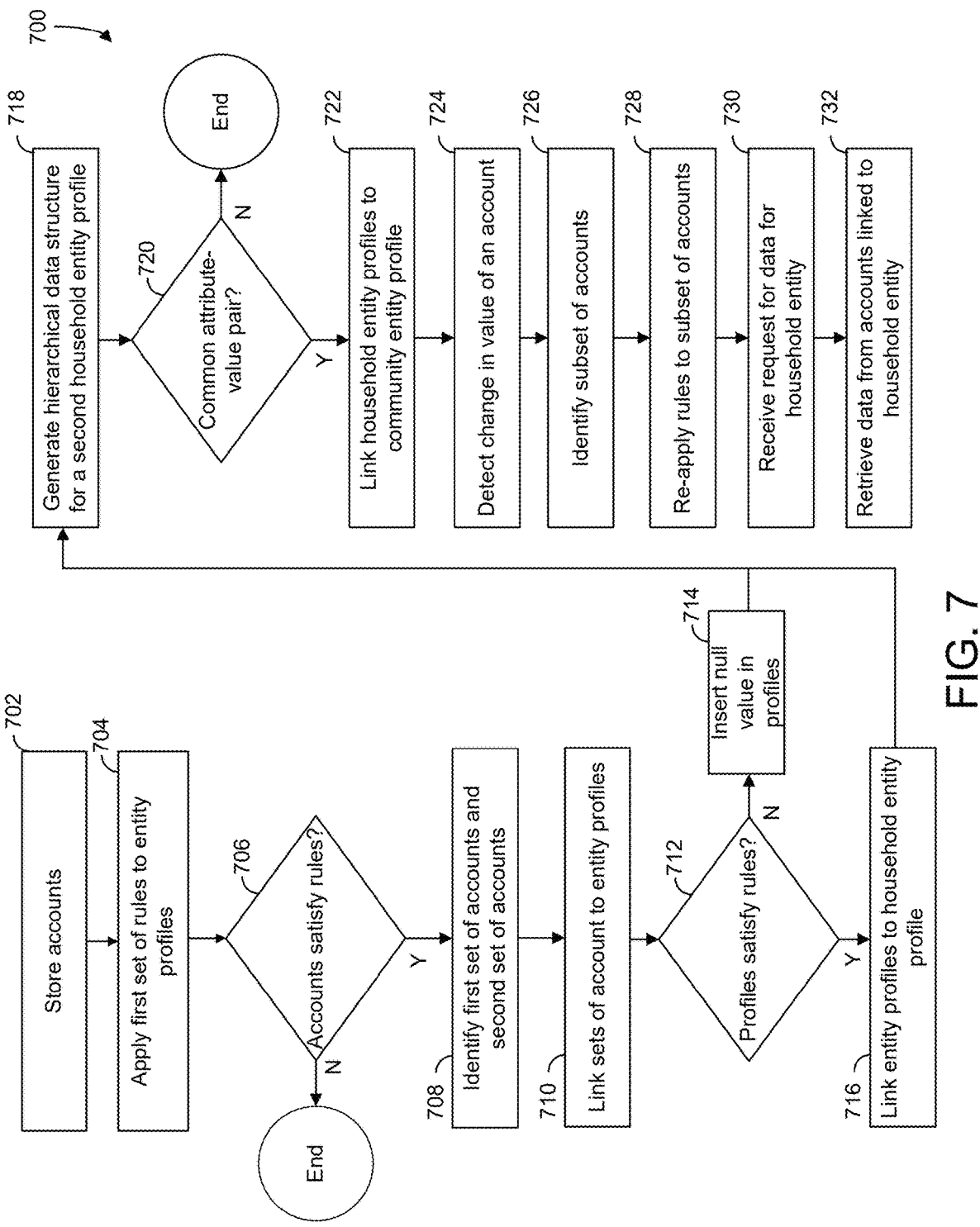
FIG. 7 is an illustration of a method for using hierarchical data structures for entity matching, in accordance with an implementation.

FIG. 7 is an illustration of a method 700 for using hierarchical data structures for entity matching, in accordance with an implementation. Method 700 can be performed by a data processing system (e.g., a client device or a data hierarchy generator 606, shown and described reference to FIG. 6, a server system, etc.). Method 700 may include more or fewer operations and the operations may be performed in any order. Performance of method 700 may enable the data processing system to generate hierarchical data structures for different household entities (or any other group entity, such as a group of individual entities that share an account or a customer number) by linking the profiles and accounts that each correspond to the same household entity together. To do so, the data processing system may apply a first set of rules to accounts to determine sets of accounts that are associated with (e.g., are owned by) the same individual. The data processing system may link the individual sets of accounts to an individual entity profile for the individual (e.g., a profile that represents or otherwise stores data for the individual). The data processing system may apply a second set of rules to the profiles for the individuals to group profiles together that are associated with or that belong to the same household. The data processing system may link the profiles and their corresponding accounts to a household profile for the household by inserting identifiers of the household entity profile into the accounts. By performing method 700, the data processing system may retrieve data about accounts that correspond to a common entity profile or household entity profile using the links between the accounts and profiles. In this way, the data processing system may retrieve data more quickly than other systems that only store data in individual records of a static or horizontal data structure.

At operation 702, the data processing system stores accounts for different individuals. The data processing system may store any type of account for individuals, such as bank accounts, checking accounts, savings accounts, credit card accounts, auto loan accounts, mortgage accounts, etc. The data processing system may initially store the accounts with account attribute-value pairs that each include values for different types of data (e.g., name, address, zip code, value, etc.). The account attribute-value pairs for an account may initially be blank. The data processing system may insert values into the attribute-value pairs as the data processing system receives inputs (e.g., user inputs) indicating the values and/or as the data processing system determines data to be inserted into the respective account attribute-value pairs. The data processing system may insert values into the attribute-value pairs by updating data structures for the respective accounts with the values.

The data processing system may store the accounts as records and/or data structures in memory, in some cases in a single or in multiple databases. The data processing system may store the accounts in a database that may additionally include profiles for different individual entities and/or group entities. The entity profiles may be stored as data structures with one or more entity attribute-value pairs that are similar to account attribute-value pairs. The group entity profiles may similarly be stored as data structures with group entity attribute-value pairs. The different profiles and accounts that are stored in the database may be updated over time as the data processing system either receives new values for the profiles or accounts or determines values for the profiles or accounts.

In some embodiments, the data processing system may store records for the individual accounts and/or profiles in the data structures for the accounts and/or profiles. For example, the data processing system may receive one or more records for each account and/or profile in the database. The records may each include values for attribute-value pairs of the respective accounts or profiles. The data processing system may store the records in data structures that are specific to each account or profile and include a list of the records, including the date the data processing system received the records or the date that the records were generated.

At operation 704, the data processing system applies a first set of rules to the accounts stored in memory. The first set of rules may be a series of rules that indicate when accounts are or likely are associated with the same individual entity. Individual rules of the first set of rules may include fuzzy matching and/or exact matching rules for different account attribute-value pairs that indicate when to match accounts together. For example, one rule may be that two accounts are associated with the same individual entity if the accounts have an exact tax identification number match, a non-exact date of birth match (e.g., a fuzzy match, which may be determined using different functions, such as an edit distance function), and a non-exact phone number match. Another rule may be that two accounts are associated with the same individual entity if the accounts have an exact name match, a non-exact tax identification number match, and a non-exact date of birth match. The data processing system may apply similar rules of any type to the attribute-value pairs of the accounts.

At operation 706, the data processing system may determine if any of the accounts satisfy a rule of the first set of rules. The data processing system may do so, for example, by identifying and comparing attribute-value pairs for the individual accounts stored in memory for the individual rules of the first set of rules. For example, if a rule includes matching rules for name and date of birth, the data processing system may identify values of the name and date of birth account attribute-value pairs and compare the values to determine if the pairs satisfy the matching rules. The data processing system may perform similar operations for each rule of the first set of rules. If the data processing system does not identify any accounts that match with each other according to the first set of rules, the data processing system may stop performing the operations of method 700. However, if the data processing system does identify accounts that match with each other, the data processing system may identify accounts that match with each other as corresponding to the same individual entities. More detail about the different types of rules of the first set of rules and how the data processing system applies such rules to identify accounts that are matched with each other is included in U.S. Pat. No. 10,983,983, entitled "Entity Resolution based on Multiple Attributes," and filed Mar. 8, 2018.

In some cases, upon applying the first set of rules to the accounts stored in memory, at operation 708, the data processing system identifies a first set of accounts and a second set of accounts. The first set of accounts may be accounts that the data processing system matched with each other using the first set of rules and that correspond to a first individual entity, and the second set of accounts may be accounts that the data processing system matched with each other using the first set of rules and that correspond to a second individual entity. In some embodiments, the data processing system may identify the sets of accounts by synthesizing the accounts that are matched with each other. For example, account A may be matched with account B, but not account C. Account C may be matched with account B. Account B may operate as a linking account and cause the data processing system to determine to group each of accounts A-C into the same set of accounts (e.g., label each account of the set of accounts with a label indicating the account's group). The data processing system may employ these synthesizing techniques to identify the first and second sets of accounts.

At operation 710, the data processing system links the first set of accounts and the second set of accounts to individual entity profiles. The data processing system may link the first set of accounts to a first individual entity profile by inserting an identifier for the first individual entity profile (e.g., a first entity identifier) into an entity account attribute-value pair (e.g., an attribute-value pair with a value dedicated to the individual entity to which the respective account is associated) of each account of the first set of accounts. The identifier may be an alphanumeric or numeric string that individually identifies the first individual entity profile. The identifier may be a pointer that includes the address of the individual entity profile within the memory of the data processing system. Accordingly, when the data processing system receives a request identifying an account that includes the identifier or an identification of the individual entity profile itself, the data processing system may retrieve data from the respective account and/or individual entity profile. The data processing system may similarly insert an identifier into a second individual entity profile for the second set of accounts such that the data processing system may quickly retrieve data for each individual entity profile and account upon receiving a request for such data.

In some embodiments, instead of inserting an identifier for the individual entity profile in the accounts themselves, the data processing system may maintain and update a separate linkage database (e.g., a relational database) that includes data indicating the links between the accounts and individual entity profiles. For example, upon identifying the first set of accounts, the data processing system may store an indication in the linkage database that indicates the first set of accounts are linked to the profile for the first individual entity. The indication may operate as a pointer to data for the respective account and the profile. The data processing system may similarly store an indication in the linkage database that indicates the second set of accounts are linked to the profile for the second individual entity upon identifying the second set of accounts. Accordingly, in these embodiments, when the data processing system receives a request identifying an account of the first set of accounts or the second set of accounts that includes an identifier or an identification of the respective individual entity profile, the data processing system may identify the relationship between the account and the individual entity profile from the linkage database and retrieve data from the individual entity profile and account using the relationship indication to identify the data.

In some embodiments, accounts may be linked to multiple individual entity profiles. This may be the case, for example, when multiple individuals own and are named on a particular account. When this occurs, the account may include data for each of the individuals and the data for the individuals may be processed as separate accounts. For example, individual A and individual B may own account C. The data processing system may store data separately for individuals A and B in the data structure that stores data for account C. Accordingly, when the data processing system applies the first set of rules to account C the data processing system may identify matches for individual A and other accounts and matches for individual B and other accounts. This may result in the data processing system grouping data for individual B with a different set of accounts than the data for individual A, and thus cause the data processing system to link account C with multiple individual entity profiles.

At operation 712, the data processing system may determine whether the two individual entity profiles satisfy a second set of rules. The second set of rules may be matching rules between individual entity profiles that indicate whether the profiles represent entities that are members of the same household. For example, the second set of rules may include matching rules that identify attributes-value pairs of individual entity profiles. If individual rules of the second set of rules are satisfied by values for individual entity profiles, the data processing system may determine the different entities of the individual entity profiles are a part of or otherwise associated with the same household. The data processing system may determine if the two individual entity profiles, and any other individual entity profiles that the data processing system has stored in memory, are members of the same household using the method described in operations 506-528 of method 500, shown and described with reference to FIG. 5.

Responsive to one or both of the two individual entity profiles, or any other individual entity profile, not satisfying any rules of the second set of rules (and therefore not being associated with a particular household or another group entity associated with the second set of rules), at operation 714, the data processing system may insert null values into a household attribute-value pair of the respective individual entity profile. The null value may be a zero or any other unique identifier that indicates the individual entity profile is not associated with a household entity profile. In some embodiments, by inserting the null value into an individual entity profile, the data processing system may indicate that the individual entity profile is the top profile of a hierarchical data structure and is not linked to any other individual entity profile or household entity profile in any manner. Such may be the case, for example, when an individual lives alone or does not have any roommates.

In some embodiments, the data processing system may delete or discard household entity profiles that are linked to too many individual entity profiles. For example, when generating a hierarchical data structure that includes multiple individual entity profiles linked to a common household entity profile, the data processing system may maintain a counter and increment the counter for each individual entity profile and/or account that would be linked to the household entity profile. The data processing system may compare the final count of the counter to a threshold (e.g., a predetermined threshold). If the data processing system determines the count exceeds the threshold, the data processing system may not generate the household entity profile and insert null values into each of the household profile attribute-value pairs of the individual entity profiles that were initially determined to be linked to the household entity profile. In instances in which the data processing system determines the number of individual entity profiles that would be linked to a household entity profile exceeds the threshold responsive to an update to a previously existing hierarchical data structure, the data processing system may delete or discard the household entity profile and replace the identifiers of the household entity profile in the individual entity profiles with null values. In this way, the data processing system may limit the number of profiles and/or accounts that can be a part of a hierarchical data structure and thus limit the processing resources that are required to retrieve data from such a hierarchical data structure. The data processing system may similarly limit the size of any type of hierarchical data structure.

However, responsive to the two individual entity profiles satisfying a rule of the second set of rules (e.g., responsive to the data processing system determining the two individual entity profiles are associated with the same household according to the second set of rules), at operation 716, the data processing system links the two individual entity profiles together. The data processing system may do so by inserting a common identifier for a household entity profile in a household attribute-value pair of each of the profiles. The identifier may be similar to the individual entity identifier that the data processing system inserts into accounts to indicate the accounts are linked to individual entity profiles. In some embodiments, the data processing system may additionally or instead insert an identifier of the household profile into the accounts that are linked to the respective individual entity profiles. In this way, the data processing system may indicate the household profiles with which the accounts are linked. The identifiers may be pointers to the household profiles such that the data processing system may quickly retrieve and/or aggregate data about the individual accounts and/or individual entity profiles that are linked to the household profiles upon receipt of a request comprising an identification of the household profile (e.g., the data processing system may compare the identification in the request to the identifiers in the accounts and/or profiles and identify accounts and/or profiles with matching identifiers and the data in the corresponding accounts and/or profile).

In some embodiments, when determining whether accounts and/or individual entity profiles satisfy the first and/or second set of rules, the data processing system applies the respective rules to historical data of each account and/or individual entity profile. For example, the data processing system may receive records that contain data for individual accounts and/or individual entity profiles over time. In one example, one record for an account may contain an individual's name, birth date, customer identification number, address, and phone number, while another record may contain the same individual's name, birth date, and customer identification number, but may contain a different address. The data processing system may store each record in the data structure for the account. Accordingly, when applying the first set of rules to the account, the data processing system may evaluate the data from each record to data of other accounts to determine if there are any matching accounts. The data processing system may similarly store and evaluate records for any number of individual entity profiles and/or accounts. In this way, the data processing system may identify matching accounts that are likely owned by the same individual, even if the most recent data does not exactly match with another account or if there is a typographical error in one of the records.

The data processing system may store such records for a predefined duration. For example, upon storing a record, the data processing system may assign a time stamp to the record that is the predefined duration from the time the data processing system stores the record. The data processing system may store an internal calendar and/or clock. The data processing system may determine when the current value of the calendar and/or clock is equal to the time stamp. Upon making this determination, the data processing system may remove the old record from memory. In this way, the data processing system may both conserve memory and avoid using stale data that could cause improper matching.

In some embodiments, the data processing system updates the records stored in memory in real-time according to a set of update rules. The update rules may be rules that indicate how to handle records that are stored for an account upon receiving a new record with data for the same account. In one example, an update rule may be that if a new record for an account contains differing information for the account (e.g., a change in address or phone number) than the currently stored records for the account, the data processing system will store the record in the data structure with the other previously stored records, thus enabling the data processing system to match the account with other accounts based on the old data. In another example, an update rule may be that if a new record contains the same but more information than a currently stored record, the data processing system will remove the currently stored records for the account to conserve memory resources without removing any potential matches. In another example, an update rule may be that if a new record contains the same or less information as other records for the account, the data processing system may discard the new record to avoid storing repetitive information and using unnecessary resources.

In some embodiments, individual entity profiles may be stored in multiple hierarchical data structures in memory in the data processing system. For example, the data processing system may generate and store hierarchical data structures that include individual entity profiles that are linked to a common account. In this example, the data processing system may identify two individual entity profiles that are linked to the same account, generate a shared profile, and link the two individual entity profiles to each other by linking the individual entity profiles to the shared profile. In another example, the data processing system may generate hierarchical data structures based on individual entity profiles having specific matching attribute-value pairs with each other. For instance, the data processing system may link two individual entity profiles to each other that have a matching customer number. The data processing system may do so by linking the two individual entity profiles to a relation profile. In some cases, the data processing system may determine to link the hierarchical data structures in the examples above by linking the relation profile and the shared profile together through a shared profile. The data processing system may do so responsive to determining the relation profile and the shared profile satisfy a matching rule (e.g., a common attribute-value pair or any other matching rule). The data processing system may generate hierarchical data structures based on any rule.

The data processing system may link the individual entity profiles to the shared profile and/or the relation profile by storing an identifier for the shared profile and/or relation profile in a shared and/or relation attribute-value pair or another attribute-value pair in the respective individual entity profiles and/or accounts linked to the individual entity profiles. The data processing system may store any number of such identifiers in accounts and/or profiles, enabling individual accounts and/or individual entity profiles to be a part of multiple hierarchical data structures. The data processing system may thus generate different types of hierarchical data structures that each store different combinations of data. In this way, the data processing system may quickly retrieve specific data in response to a request by identifying the hierarchical data structure that includes a combination of individual entity profiles and/or accounts that includes data to include in a response to the request (e.g., the data processing system can quickly retrieve data for a household by identifying a household hierarchical data structure and retrieving the data from the accounts of the household).

At operation 718, the data processing system generates a hierarchical data structure for a second household entity profile. The data processing system may generate the hierarchical data structure for the second household entity profile in a similar manner to how the data processing system generated the hierarchical data structure for the first household entity profile in operations 704-716. For instance, the data processing system may identify third and fourth sets of accounts when the data processing system applies the first set of rules to the accounts in memory. The data processing system may link the third and fourth sets of accounts to respective individual entity profiles using similar methods to the above. The data processing system may determine the third and fourth individual entity profiles are associated with individual entities of the same household or other group entity. The data processing system may then link the third and fourth individual entity profiles and/or the accounts linked to the third and fourth individual entity profiles to a second household entity profile representing the household.

In this way, the data processing system may generate a hierarchical data structure that includes data for each account that is owned by members of the same household such that data for the household and members of the household may be quickly retrieved upon receipt of a request.

At operation 720, the data processing system determines if the first hierarchical data structure for the first household entity profile and the second hierarchical data structure for the second household entity profile includes a common attribute-value pair. The data processing system may do so by comparing the values of the corresponding attribute-value pairs between the first and second household profiles. In some embodiments, the data processing system may only compare a subset of the attribute-value pairs of the household entity profiles with each other. For example, the data processing system may only compare attribute-value pairs for email, phone, and account number of the two household entity profiles and not other attribute-value pairs such as last name and address, thus minimizing false positives in matching households. If the data processing system determines there are not any matching attribute-value pairs based on the comparison, the data processing system may stop performing the operations of method 700.

However, if the data processing system identifies at least one matching attribute-value pair based on the comparison, at operation 722, the data processing system may link the matching household entity profiles together. The data processing system may do so by generating a community entity profile and linking the matching household entities to the community entity profile. The data processing system may link the household entities to the community entity profile by inserting an identifier of the community entity profile in community attribute-value pairs of the household entity profiles, the individual entity profiles, and/or the accounts; and/or a linkage database such that the data processing system may quickly retrieve data from accounts and/or profiles that are linked to the community entity upon receiving a request for such data, as described above.

In some cases, multiple household entity profiles may be linked to the same community entity profile. For example, household entity profiles A and B may share the same account number, household entity profiles B and C may share the same phone number, and household entity profiles C and D may share the same email address. The data processing system may identify the matching attribute-value pairs and link each of the household entity profiles to the same community entity profile responsive to identifying the matches.

In some embodiments, the data processing system may link the household entity profile of a first hierarchical data structure to an individual entity profile (e.g., a third entity profile) of a second hierarchical data structure. For example, when generating a second hierarchical data structure, the data processing system may generate an individual entity profile that links a series of accounts together. The data processing system may not, however, identify any individual entity profiles that match the individual entity profile according to the second set of rules. The data processing system may insert a null value into the household attribute-value pair of the individual entity profile accordingly. When the data processing system queries hierarchical data structures in memory to link with the first hierarchical data structure, the data processing system may identify the null value in the household attribute-value pair, determine the individual entity profile is at the top of the second hierarchical data structure based on the null value, and compare the attribute-value pairs of the household profile of the first hierarchical data structure to the individual entity profile similar to the above responsive to identifying the null value. If the data processing system identifies a matching attribute-value pair based on the comparison, the data processing system may link the individual entity profile with the household entity profile together (e.g., link the two profiles to a common community entity profile).

At operation 724, the data processing system may detect a change in a value of an account. The change in value may be a user input change that the data processing system determines based on a new set of data. For example, the data processing system may detect a change in address, name, tax identification number, phone number, email address, postal address, or any other value of an attribute-value pair of an account of the first hierarchical data structure. The data processing system may detect the change, for example, by placing interrupts at each attribute-value pair of the accounts of the first hierarchical data structure and detecting the change when an interrupt is triggered. In another example, the data processing system may detect the change upon receiving a new record for an account, comparing the data from the record to corresponding data in the account (e.g., comparing the name in the record to the name in the account), and determining if the values match. The data processing system may detect a change when a value does not match based on such a comparison.

At operation 726, the data processing system may identify a subset of accounts of the plurality of accounts responsive to detecting the change in value. The data processing system may identify the subset of accounts by identifying the accounts that have matching attribute-value pairs to the account with the changed value. In some embodiments, the data processing system may only identify accounts that have matching attribute-value pairs of a predefined type or types (e.g., address, name, email, tax identification number, etc.). In some embodiments, the data processing system may only identify accounts that have a predefined number of matching attribute-value pairs for the subset of accounts. In this way, the data processing system may filter or reduce the number of accounts to apply rules to when generating or updating a hierarchical data structure for the updated accounts and avoid processing data for every stored account, which could take upwards of eight hours for a single update and cause the system to be unmanageable.

At operation 728, the data processing system may re-apply rules to the accounts to generate a hierarchical data structure for the updated account. For instance, the data processing system may re-apply the first set of rules to the subset of accounts to identify sets of accounts that satisfy the rules. The data processing system may identify or generate individual entity profiles for the sets of accounts and link the individual entity profiles to their corresponding sets of accounts. The data processing system may then apply the second set of rules to the individual entity profiles to generate and/or identify household entity profiles to link to the individual entity profiles. The data processing system may then compare the attribute-value pairs of the household entity profiles to identify community entity profiles for the household entity profiles. The data processing system may similarly create new hierarchical data structures when a new account is added to memory (e.g., the data processing system may detect the new account and initiate the process of operations 726 and 728 by identifying a subset of accounts that have matching attribute-value pairs to the new account). In this way, the data processing system may maintain real-time hierarchy data structures for accounts as data for the accounts are updated and/or new accounts are added to the memory of the data processing system.

At operation 730, the data processing system may receive a request for data regarding the household entity represented by the household entity profile of the first hierarchical data structure. The request may include an identification of the household entity. The data processing system may identify the identification of the household entity from the request. The data processing system may compare the identification to the accounts and/or profiles of the hierarchical data structures stored in memory. Upon identifying a hierarchical data structure with an account or profile that has a matching identifier to the identification, the data processing system may identify the accounts of the hierarchical data structure using the pointers that point to the different accounts and profiles and, at operation 732, retrieve data about the respective accounts and profiles of the hierarchical data structure. Upon identifying the account that has a matching household identifier to the identification in the request, the data processing system may stop searching memory. Thus, the data processing system may identify the requested data from the hierarchical data structure and avoid searching the entire database for data of accounts and profiles at each instance the data processing system receives a request.

Figures 8A, 8B:
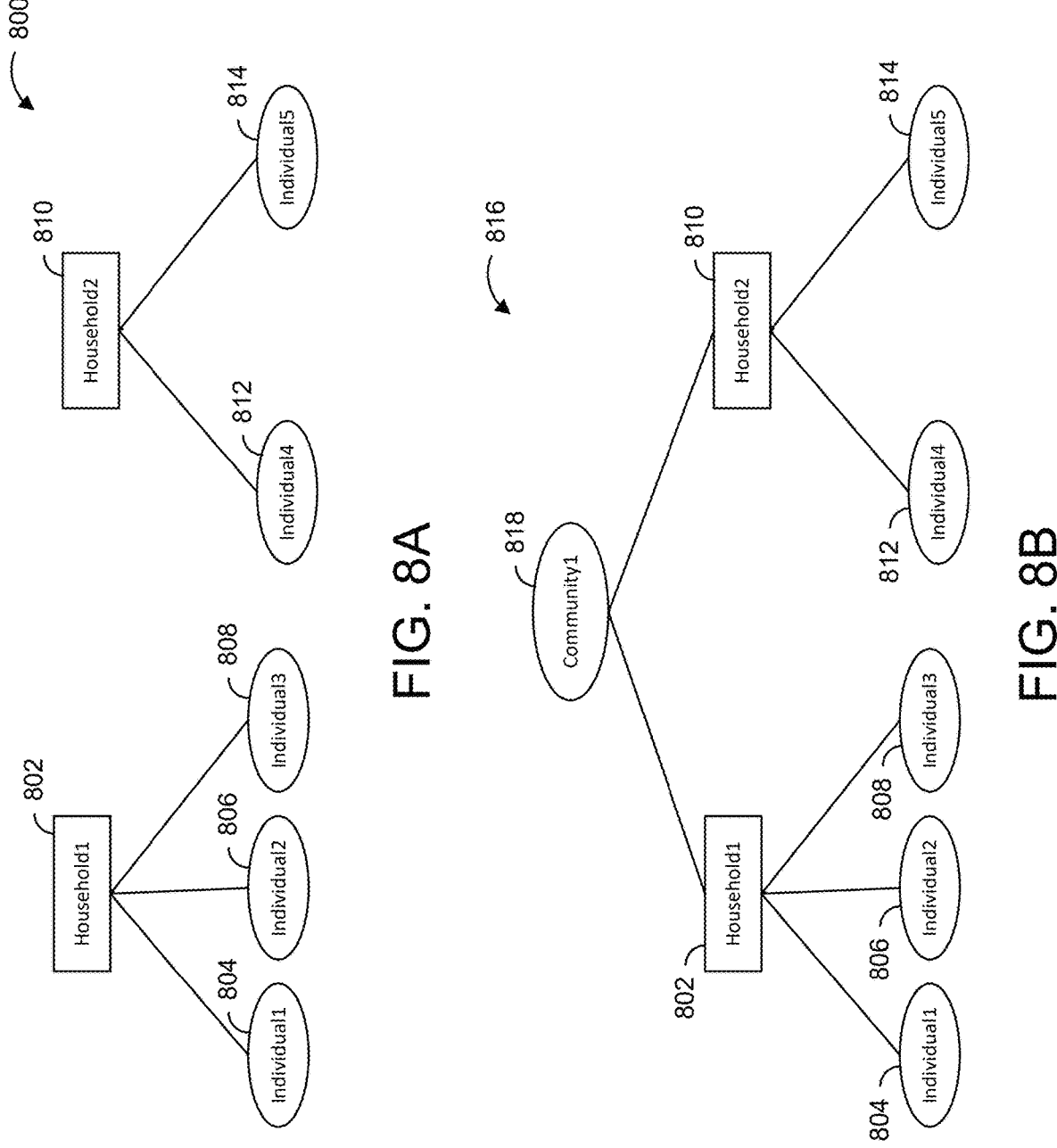
FIG. 8A is an illustration of two hierarchical data structures storing data for household entities, in accordance with an implementation.
FIG. 8B is an illustration of the two hierarchical data structures of FIG. 8A linked by a top level data structure, in accordance with an implementation.

FIG. 8A is an illustration of two hierarchical data structures 800 for storing data for household entities, in accordance with an implementation. One hierarchical data structure includes a household entity profile 802 and individual entity profiles 804, 806, and 808. Individual entity profiles 804-808 may be linked to household entity profile 802 by identifiers or labels identifying household entity profile 802 that are stored in individual entity profiles 804-808. The other hierarchical data structure includes a household entity profile 810 and individual entity profiles 812 and 814. Individual entity profiles 812 and 814 may be linked to household entity profile 810 similar to how individual entity profiles 804-808 may be linked to household entity profile 802. By generating hierarchical data structures in this way, a data processing system (e.g., a client device or a data hierarchy generator 606, shown and described reference to FIG. 6, a server system, etc.) may be able to quickly identify the respective hierarchical data structure (or profiles of the hierarchical data structure) based on the identifiers and links of the hierarchical data structure and retrieve data from the data structures of the profiles without searching all of memory as computers that are not organized in this manner would have to do.

FIG. 8B is an illustration of a hierarchical data structure 816 containing the two hierarchical data structures of FIG. 8A linked by a top level data structure, in accordance with an implementation. As illustrated, hierarchical data structure 816 includes two hierarchical data structures 800 that are linked with each other through a community profile 818. The data processing system may link the two hierarchical data structures 800 to the community profile 818 by inserting identifiers of community profile 818 into attribute-value pairs of household entity profiles 802 and 810 and/or individual entity profiles 804-808 and/or 812-814. By linking household entity profiles together in this manner, the data processing system may be able to retrieve data for the entire community represented by community profile 818.

In some embodiments, the data processing system may link the two hierarchical data structures 800 to community profile 818 responsive to the two hierarchical data structures 800 having a common attribute-value pair. For example, the data processing system may compare the attribute-value pairs of email, phone, and account number of the household entity profiles 802 and 810 with each other. Responsive to identifying a match of at least one attribute-value pair (or more than one, or a specific combination of attribute-value pairs, depending on the implementation), the data processing system may determine two hierarchical data structures 800 are a part of the same community and link household entity profiles 802 and 810 to community profile 818. In some cases, the data processing system may only compare the email, phone, and account number attribute-value pairs because matches of other attribute-value pairs (e.g., last name and address) may result in overmatching and cause the systems and methods described herein to lose some of the efficiency benefits they provide (e.g., overmatching may cause community hierarchical data structures to be too large and cause the data processing system to inefficiently search too many hierarchical data structures).

In some cases, a hierarchical data structure may include a household entity profile that does not match with another household entity profile. In this case, the data processing system may insert a null value into a community household attribute-value pair of the household entity profile and/or community attribute-value pairs of the profiles and/or accounts of the hierarchical data structure to indicate the household entity profile is at the top of the hierarchical data structure.

Figures 9A, 9B:
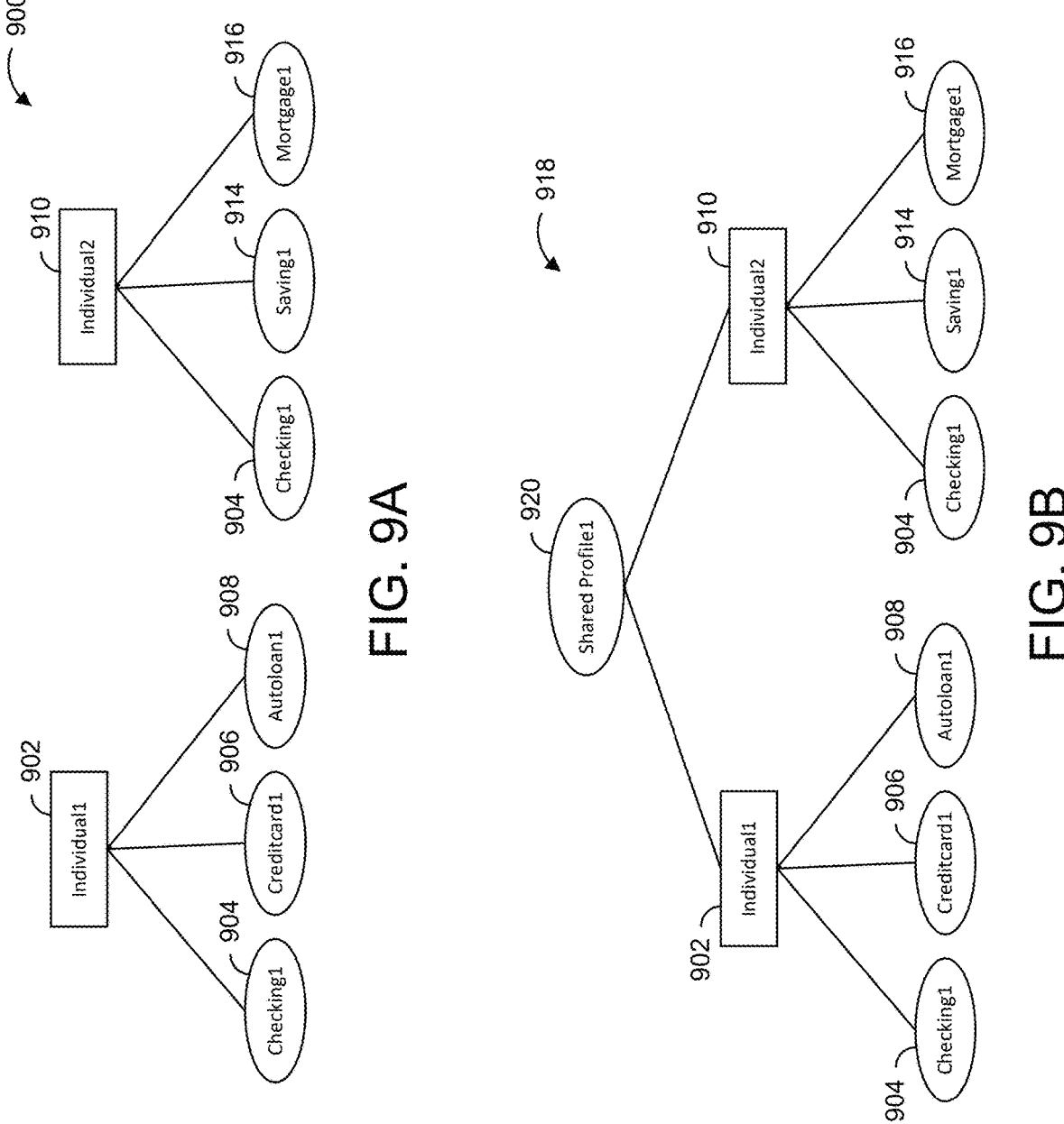
FIG. 9A is an illustration of two hierarchical data structures storing data for two different entities, in accordance with an implementation.
FIG. 9B is an illustration of the two hierarchical data structures of FIG. 9A linked by a top level data structure, in accordance with an implementation.

FIG. 9A is an illustration of two hierarchical data structures storing data for two individual entities, in accordance with an implementation. One hierarchical data structure includes an individual entity profile 902 and accounts 904, 906, and 908. Accounts 904-908 may be linked to individual entity profile 902 by identifiers or labels identifying individual entity profile 902 that are stored in accounts 904-908. The other hierarchical data structure includes an individual entity profile 910 and accounts 912, 914, and 916. Accounts 912-916 may be linked to individual entity profile 910 similar to how accounts 904-908 may be linked to individual entity profile 902. By generating hierarchical data structures in this way, a data processing system (e.g., a client device or a data hierarchy generator 606, shown and described reference to FIG. 6, a server system, etc.) may be able to quickly identify the respective hierarchical data structure (or profiles and/or accounts of the hierarchical data structure) based on the identifiers and links of the hierarchical data structure. Accordingly, the data processing system may retrieve data from the data structures of the profiles and accounts without searching all of memory as computers that are not organized in this manner would have to do.

FIG. 9B is an illustration of the two hierarchical data structures of FIG. 9A linked by a top level data structure to form a hierarchical data structure 918, in accordance with an implementation. As illustrated, hierarchical data structure 918 includes two hierarchical data structures 900 that are linked with each other through a shared profile 920. Shared profile 920 may be a profile that links individual entity profile 902 and individual entity profile 910 as a result of the data processing system determining individual entity profile 902 and individual entity profile 910 are linked to a common account (e.g., account 904). As with the other links, the data processing system may link the two hierarchical data structures 900 to the shared profile 920 by inserting identifiers of shared profile 920 into attribute-value pairs of individual entity profiles 902 and 910 and/or account 904-908 and 914-916. In some cases, the data processing system may insert the identifiers of shared profile 920 in addition to identifiers of household entity profiles that individual entity profiles 902 and/or 910 may be associated with. Thus, the data processing system may generate hierarchical data structures that may have common individual entity profiles and/or accounts. In this way, the data processing system may enable the data processing system to filter searches in response to different types of requests (e.g., requests for data about a household or community or requests for data about entities that have a shared profile) using hierarchical data structures that are each dedicated to a storing data for a specific type of request (e.g., a request may include an identifier for a hierarchical data structure of a specific type through which the data processing system retrieves data).

Figure 10:
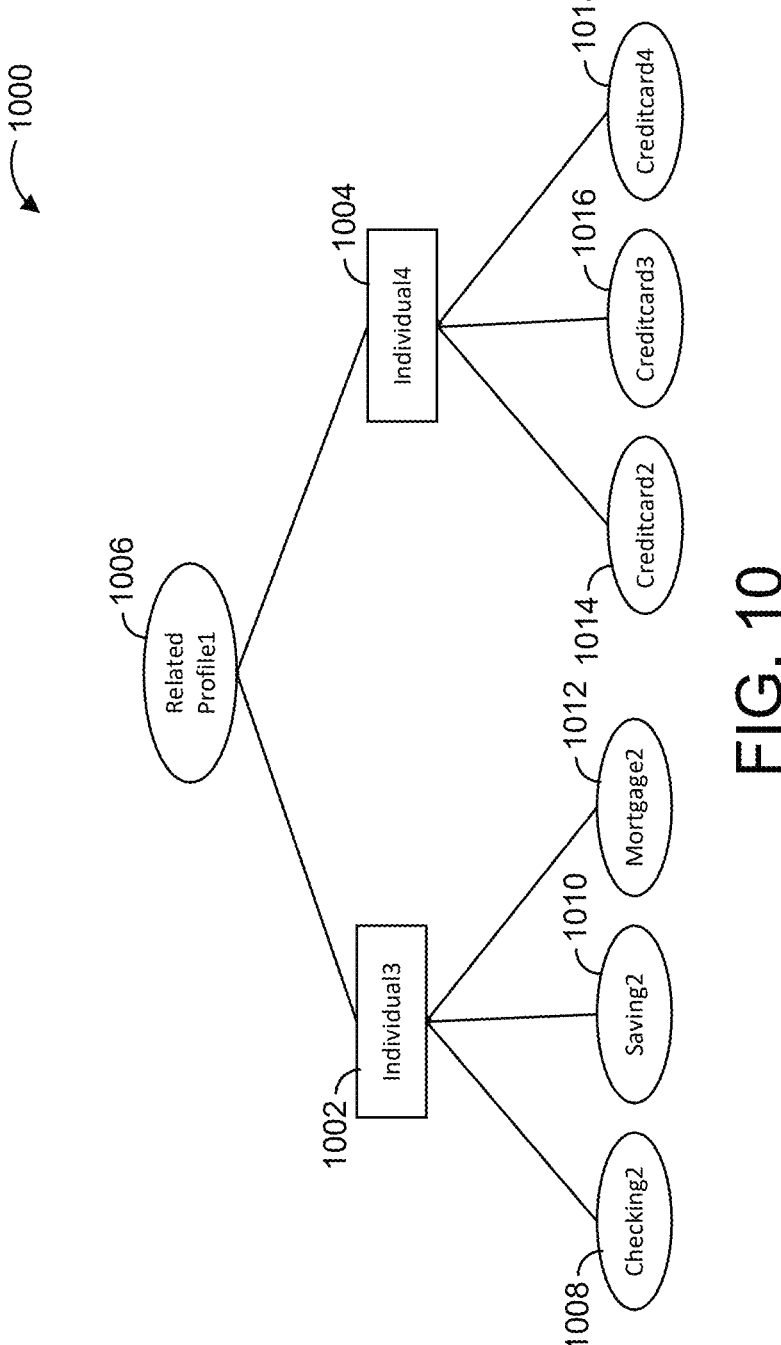
FIG. 10 is an illustration of two hierarchical data structures linked by a top level data structure, in accordance with an implementation.

FIG. 10 is an illustration of two hierarchical data structures linked by a top level data structure to form a hierarchical data structure 1000, in accordance with an implementation. Hierarchical data structure 1000 may include individual entity profiles 1002 and 1004 that are linked to a related profile 1006 as well as accounts 1008, 1010, and 1012, and accounts 1014, 1016, 1018, respectively. Hierarchical data structure 1000 may be another implementation of a hierarchical data structure that includes individual entity profiles that a data processing system (e.g., a client device or a data hierarchy generator 606, shown and described reference to FIG. 6, a server system, etc.) has matched according to a particular rule. In this case, the data processing system may have matched individual entity profile 1002 with individual entity profile 1004 responsive to determining the two individual entity profiles 1002 and 1004 have a common legal participant identification number attribute-value pair. The match may indicate that individual entity profiles 1002 and 1004 are related in some manner. Accordingly, the data processing system may link each of individual entity profiles 1002 and 1004 to a related profile 1006 to indicate the relation. In some cases, the data processing system may insert the identifiers of related profile 1006 into individual entity profiles 902 and/or 910 (and/or their corresponding accounts) in addition to identifiers of household entity profiles and/or shared profiles that individual entity profiles 902 and/or 910 may be associated with. Thus, the data processing system may generate hierarchical data structures that may have common individual entity profiles and/or accounts. In this way, the data processing system may enable the data processing system to filter searches in response to different types of requests (e.g., requests for data about a household or community or requests for data about entities that have a shared profile) using hierarchical data structures that are each dedicated to a storing data for a specific type of request.

Hierarchical data structure 918, shown and described with reference to FIG. 9B, and hierarchical data structure 1000 may be structured data for different types of requests. For example, a user may query memory for data for risk and fraud management (e.g., request data including an identifier for risk or fraud management) and the data processing system may identify and retrieve data from hierarchical data structure 918 because hierarchical data structure 918 includes data for shared or co-owned accounts, which are often associated with fraud. A user may query memory for data for customer management and the data processing system may identify and retrieve data from hierarchical data structure 1000 based on the request because hierarchical data structure 1000 provides an overview of how individuals are related to each other.

Hierarchical data structures 918 and 1000 are just two examples of hierarchical data structures that may be stored in memory. Accounts and individual entity profiles may be linked or a part of any number of hierarchical data structures based on any number of individual or sets of rules. The data processing system may generate these hierarchical data structures by inserting identifiers of upper level profiles (e.g., household entity profiles, shared profiles, related profiles, etc.) in lower level profiles (e.g., individual entity profiles) and/or their corresponding accounts such that the data processing system may quickly identify the hierarchical data structures from the identifiers. In this way, the data processing system may store a large and complex web of hierarchical data structures using only the memory requirements that are required to store the identifiers in profiles and/or accounts.

Figure 11:
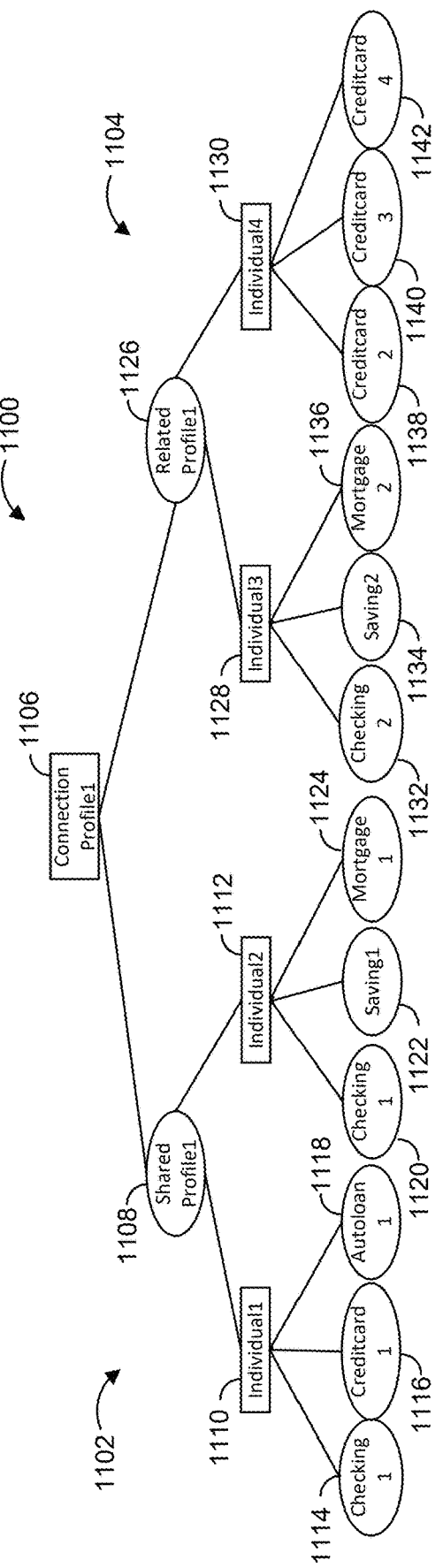
FIG. 11 is an illustration of two three-level hierarchical data structures linked by a top level data structure, in accordance with an implementation.

FIG. 11 is an illustration of a hierarchical data structure 1100 that includes two three-level hierarchical data structures linked by a top level data structure, in accordance with an implementation. Hierarchical data structure 1100 may include a shared profile hierarchical data structure 1102 and a related profile hierarchical data structure 1104 that are linked together by a connection profile 1106. Shared profile hierarchical data structure 1102 may include a shared profile 1108, individual entity profiles 1110 and 1112, and accounts 1114, 1116, 1118, 1120, 1122, and 1124. Shared profile hierarchical data structure 1102 may be similar to or the same as hierarchical data structure 918, shown and described with reference to FIG. 9B. Related profile hierarchical data structure 1104 may include a related profile 1126, individual entity profiles 1128 and 1130, and accounts 1132, 1134, 1136, 1138, 1140, and 1142. Related profile hierarchical data structure 1104 may be the same as or similar to hierarchical data structure 1000, shown and described with reference to FIG. 10. A data processing system (e.g., a client device or a data hierarchy generator 606, shown and described reference to FIG. 6, a server system, etc.) may store hierarchical data structure 1100 in memory.

Connection profile 1106 may be a top level profile or data structure of hierarchical data structure 1100 that links hierarchical data structures 1102 and 1104 together. The data processing system may generate connection profile 1106 or otherwise link hierarchical data structures 1102 and 1004 to connection profile 1106 responsive to determining shared profile 1108 and related profile 1126 satisfy a matching rule (e.g., a rule indicating they share a common attribute-value pair, are linked to a common individual entity profile, and/or are linked to a common account). Connection profile 1106 may include attribute-value pairs identifying any common data (or an aggregation of data of the same type) between hierarchical data structures 1102 and 1104 (e.g., common data between shared profile 1108 and related profile 1126). By linking shared hierarchical data structure 1102 and hierarchical data structure 1104 in this manner, the data processing system may be able to quickly retrieve all of the data in hierarchical data structures 1102 and 1104 in response to a request based on the request including an identifier of connection profile 1106. The data processing system may retrieve data about individual entities that are related to each other based on different sets of rules, but that the data processing system is likely to receive a request for data about each of the individual entity profiles and/or the accounts of the individual entity profiles.

Figure 12:
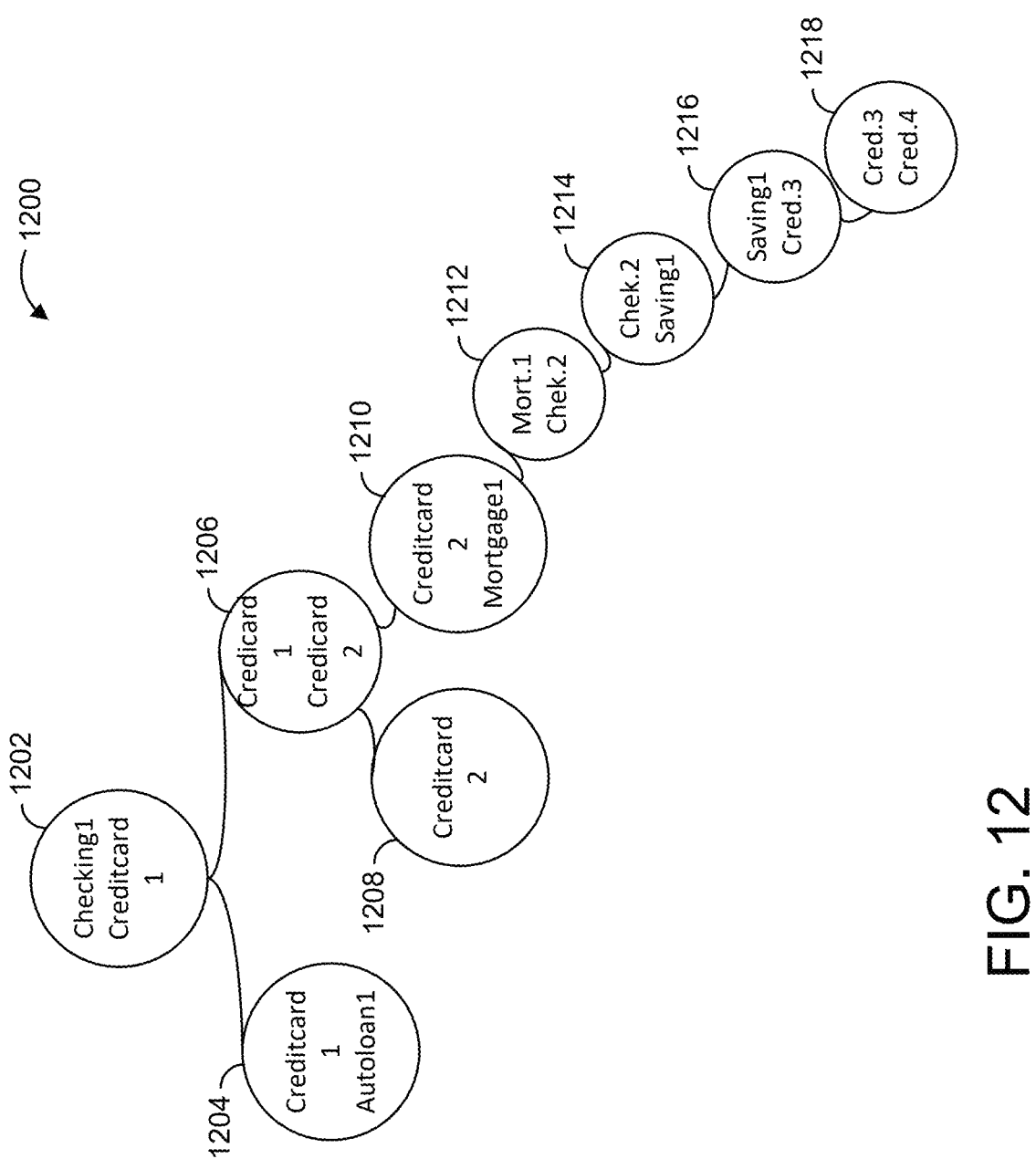
FIG. 12 is an illustration of a seven-layered hierarchical data structure, in accordance with an implementation.

FIG. 12 is an illustration of a seven-layered hierarchical data structure 1200, in accordance with an implementation. Hierarchical data structure 1200 may be a shared profile hierarchical data structure (e.g., be similar to or the same hierarchical data structure 918, shown and described with reference to FIG. 9B) in which the individual entity profiles of hierarchical data structure 1200 share (e.g., co-own) an account with at least one other individual entity profile of hierarchical data structure 1200. Hierarchical data structure 1200 may include individual entity profiles 1202-1218, which may each be linked to accounts described in the circles of FIG. 12 representing individual entity profiles 1202-1218.

Hierarchical data structure 1200 may include layers of individual entity profiles that are linked with their immediately adjacent layers. For example, individual entity profile 1202 may be at the top layer (e.g., layer 1) of hierarchical data structure 1200 and may be an entity of interest (e.g., an entity for which the data processing system is retrieving data in response to a request identifying the entity) of hierarchical data structure 1200. Individual entity profile 1202 may share at least one account with individual entity profiles 1204 and 1206 at the second layer of hierarchical data structure 1200. Individual entity profile 1206 may share at least one account with individual entity profiles 1208 and 1210 at layer 3. Individual entity profile 1210 may share at least one account with individual entity profile 1212, which may share at least one account with individual entity profile 1214, and so forth. In some embodiments, the different layers of FIG. 12 represent connections that individual entity profiles have with other individual entity profiles through separate shared profiles. By organizing hierarchical data structure 1200 into different layers as such, the data processing system may trace how individual entity profile 1202 is connected to each individual entity profile of hierarchical data structure 1200 (e.g., trace the shared profiles that are between individual entity profiles). In other words, the layer function may help select the relation radius of the nodes in a graph (e.g., limit the number of shared entity profiles (e.g., limit the number to a defined threshold) that may be between a top individual entity profile and an individual entity profile from which the data processing system collects data). In this way, the data processing system may avoid collecting data for too many individual entity profiles upon receiving a request for data about profiles that are related or otherwise linked to a particular individual entity profile.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the client devices 102 and/or 104 or household entity generator 106) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A computer-implemented method for grouping a plurality of account records, the method comprising:

storing, by at least one processor, a plurality of account records, each account record comprising at least a name, address, and account identifier;

partitioning a set of grouping rules into at least two subsets according to attribute type;

applying, by the at least one processor, a different normalization algorithm to each rule subset according to a corresponding attribute type;

identifying, for each account record, other account records that satisfy at least one grouping rule subset after normalization;

synthesizing identified account records into a group based on the identified account records sharing a common account record that satisfies grouping rule subsets corresponding to different attribute types;

comparing a number of account records identified as satisfying at least one grouping rule subset to a predefined threshold for the at least one grouping rule subset, and responsive to the number exceeding the predefined threshold, removing group associations from the identified account records;

linking the account records in each synthesized group to an entity profile by inserting an entity identifier into an entity attribute-value pair of each account record;

assigning each identified group a group identifier; and updating each account record in an identified group to include the corresponding group identifier in a group attribute-value pair of each account record, whereby group membership is verifiable by examination of the records.

2. The method of claim 1, wherein the normalization algorithm applied to rules related to the name attribute comprises phonetic hashing or edit distance matching.

3. The method of claim 1, wherein the rule subset assigned to address attributes applies a minimum similarity threshold based on edit distance or substring matching.

4. The method of claim 1, further comprising, upon detecting a change to any attribute in any account record, re-applying only affected rule subsets to update group assignments and corresponding group identifiers.

5. The method of claim 1, further comprising, upon determining that any group exceeds a predefined group size threshold, removing the group identifier from all account records of said group.

6. The method of claim 1, wherein each group identifier is a globally unique alphanumeric code generated by hashing normalized values of the attributes on which grouping is based.

7. The method of claim 1, further comprising storing, for each group identifier, metadata indicating date of creation and number of account records associated with the group.

8. The method of claim 1, wherein the account records and group identifiers are maintained within a relational database, with the group identifier corresponding to a foreign key column.

9. The method of claim 1, further comprising, prior to group assignment, applying at least one exclusion rule requiring absence of a specified attribute value to prevent an account record from joining a group.

10. The method of claim 1, wherein group membership for any account record is detectable by querying the account records for a presence of the group identifier.

11. A system for grouping account records, comprising:

a memory storing a plurality of account records, each account record comprising at least a name, address, and account identifier; and at least one processor configured to:

partition a set of grouping rules into at least two subsets according to attribute type;

apply a different normalization algorithm to each rule subset according to a corresponding attribute type;

identify, for each account record, other account records that satisfy at least one grouping rule subset after normalization;

synthesize identified account records into a group based on the identified account records sharing a common account record that satisfies grouping rule subsets corresponding to different attribute types;

compare a number of account records identified as satisfying at least one grouping rule subset to a predefined threshold for the at least one grouping rule subset, and responsive to the number exceeding the predefined threshold, remove group associations from the identified account records;

link the account records in each synthesized group to an entity profile by inserting an entity identifier into an entity attribute-value pair of each account record;

assign each identified group a group identifier; and update each account record in an identified group to include the corresponding group identifier in a group attribute-value pair of each account record, whereby group membership is verifiable by examination of the account records.

12. The system of claim 11, wherein the at least one processor is further configured such that the normalization algorithm applied to rules related to the name attribute comprises phonetic hashing or edit distance matching.

13. The system of claim 11, wherein the at least one processor is further configured such that the rule subset assigned to address attributes applies a minimum similarity threshold based on edit distance or substring matching.

14. The system of claim 11, wherein the at least one processor is further configured, upon detecting a change to any attribute in any account record, to re-apply only affected rule subsets to update group assignments and corresponding group identifiers.

15. The system of claim 11, wherein the at least one processor is further configured, upon determining that any group exceeds a predefined group size threshold, to remove the group identifier from all account records of said group.

16. A non-transitory computer-readable storage medium storing instructions that, when executed by at least one processor, cause the processor to perform a method comprising:

storing a plurality of account records, each account record comprising at least a name, address, and account identifier;

partitioning a set of grouping rules into at least two subsets according to attribute type;

applying a different normalization algorithm to each rule subset according to a corresponding attribute type;

identifying, for each account record, other account records that satisfy at least one grouping rule subset after normalization;

synthesizing identified account records into a group based on the identified account records sharing a common account record that satisfies grouping rule subsets corresponding to different attribute types;

comparing a number of account records identified as satisfying at least one grouping rule subset to a predefined threshold for the at least one grouping rule subset, and responsive to the number exceeding the predefined threshold, removing group associations from the identified account records;

linking the account records in each synthesized group to an entity profile by inserting an entity identifier into an entity attribute-value pair of each account record;

assigning each identified group a group identifier; and linking the account records in each synthesized group to an entity profile by inserting an entity identifier into an entity attribute-value pair of each account record.

17. The non-transitory computer-readable storage medium of claim 16, wherein the instructions for applying a normalization algorithm to rules related to the name attribute cause the processor to perform phonetic hashing or edit distance matching.

18. The non-transitory computer-readable storage medium of claim 16, wherein the instructions for the rule subset assigned to address attributes cause the processor to apply a minimum similarity threshold based on edit distance or substring matching.

19. The non-transitory computer-readable storage medium of claim 16, wherein the instructions further cause the processor, upon detecting a change to any attribute in any account record, to re-apply only affected rule subsets to update group assignments and corresponding group identifiers.

20. The non-transitory computer-readable storage medium of claim 16, wherein the instructions further cause the processor, upon determining that any group exceeds a predefined group size threshold, to remove the group identifier from all account records of said group.

* * * * *